United States Patent
Sherman

(10) Patent No.: US 12,360,719 B1
(45) Date of Patent: Jul. 15, 2025

(54) SYSTEMS AND METHODS OF GENERATING A DISPLAY DATA STRUCTURE FROM AN INPUT SIGNAL

(71) Applicant: Sherman IP, LLC, Coeur d'Alene, ID (US)

(72) Inventor: William Sherman, Coeur d'Alene, ID (US)

(73) Assignee: Sherman IP, LLC, Coeur d'Alene, ID (US)

(*) Notice: Subject to any disclaimer, the term of this patent is extended or adjusted under 35 U.S.C. 154(b) by 0 days.

(21) Appl. No.: 18/821,977

(22) Filed: Aug. 30, 2024

Related U.S. Application Data

(63) Continuation-in-part of application No. 18/731,769, filed on Jun. 3, 2024, which is a continuation-in-part of application No. 18/403,213, filed on Jan. 3, 2024, now Pat. No. 12,002,129.

(51) Int. Cl.
*G06F 3/14* (2006.01)
*G06F 3/0482* (2013.01)

(52) U.S. Cl.
CPC .......... *G06F 3/1407* (2013.01); *G06F 3/0482* (2013.01)

(58) Field of Classification Search
CPC .... G06F 3/1407; G06F 3/0482; G06T 11/206; G06T 11/001; G06Q 40/06
See application file for complete search history.

(56) References Cited

U.S. PATENT DOCUMENTS

| | | | |
|---|---|---|---|
| 10,783,214 B1 * | 9/2020 | Rowe | G06F 16/904 |
| 11,556,992 B2 | 1/2023 | Nguyen | |
| 11,663,668 B1 | 5/2023 | Bloom | |
| 2011/0028856 A1 | 2/2011 | Zhang | |
| 2015/0109307 A1 * | 4/2015 | Baartz | A61B 5/339 |
| | | | 345/440.1 |
| 2015/0216762 A1 | 8/2015 | Oohashi | |
| 2016/0196610 A1 | 7/2016 | Eastwood | |
| 2018/0129368 A1 * | 5/2018 | Cheung | G06T 11/206 |
| 2021/0342691 A1 | 11/2021 | Lui | |

(Continued)

OTHER PUBLICATIONS

Huanze Tang; "Stock Prices Prediction Based on ARMA Model"; IEEE, 2021 International Conference on Computer, Blockchain and Financial Development (CBFD), pp. 201-204. (Year: 2021).

*Primary Examiner* — Jeffery A Brier
(74) *Attorney, Agent, or Firm* — Caldwell Intellectual Property Law

(57) ABSTRACT

An apparatus and method for an apparatus for generating a display data structure from an input signal. The apparatus includes at least a processor and a memory communicatively connected to the at least a processor, wherein the memory contains instructions configuring the at least a processor to receive an input signal, apply a momentum processing module to the input signal, receive at least one directional momentum signal for the at least a time series from the momentum processing module, apply an autoregressive signal processing module to the at least one directional momentum signal to determine at least one filtered momentum, generate a display data structure using the at least one filtered momentum signal and a plurality of threshold values, and transmit the display data structure to a remote device, wherein the display data structure is configured to cause the remote device to display the dynamic vector.

16 Claims, 16 Drawing Sheets

(56) References Cited

U.S. PATENT DOCUMENTS

2022/0164883 A1    5/2022  Schneider
2022/0236965 A1*   7/2022  Rahill-Marier ......... G06F 9/451
2023/0206058 A1    6/2023  Wellmann

* cited by examiner

SYSTEMS AND METHODS OF GENERATING A DISPLAY DATA STRUCTURE FROM AN INPUT SIGNAL

CROSS-REFERENCE TO RELATED APPLICATIONS

This application is a continuation-in-part of U.S. patent application Ser. No. 18/731,769, filed on Jun. 3, 2024, and entitled "SYSTEMS AND METHODS OF GENERATING A DISPLAY DATA STRUCTURE FROM AN INPUT SIGNAL," which is a continuation in part of U.S. patent application Ser. No. 18/403,213, filed on Jan. 3, 2024, now U.S. Pat. No. 12,002,129, Issued Jun. 4, 2024, and entitled "SYSTEMS AND METHODS OF GENERATING A DISPLAY DATA STRUCTURE FROM AN INPUT SIGNAL," each of which are incorporated by reference herein in their entirety.

FIELD OF THE INVENTION

The present invention generally relates to the field of signal processing. In particular, the present invention is directed to systems and methods of generating a generating a display data structure from an input signal.

BACKGROUND

Nonstationary processes are notoriously difficult to analyze due to their unstable statistical properties. A way of processing nonstationary processes such that conclusions regarding the process can be drawn and displayed is needed.

SUMMARY OF THE DISCLOSURE

In an aspect, an apparatus for generating a display data structure from an input signal is disclosed. The apparatus includes at least a processor; and a memory communicatively connected to the at least a processor, wherein the memory contains instructions configuring the at least a processor to receive an input signal, wherein the input signal comprises at least a time-series sequence. The memory includes further instructions configuring the at least a processor to receive, from a user interface, a user configuration data structure. The memory includes further instructions configuring the at least a processor to configure a signal processing module as a function of one or more signal processing parameters of the user configuration data structure. The memory includes further instructions configuring the at least a processor to filter the input signal using the configured signal processing module to generate a filtered signal. The memory includes further instructions configuring the at least a processor to configure a comparator module as a function of one or more comparator parameters of the user configuration data structure. The memory includes further instructions configuring the at least a processor to generate a comparator output as a function of the configured comparator module, wherein the comparator module is configured to apply a plurality of boolean conditions to the filtered signal. The memory includes further instructions configuring the at least a processor to generate a display data structure using the filtered signal and comparator output. The memory includes further instructions configuring the at least a processor to transmit the display data structure to a remote device.

In another aspect, a method of generating a display data structure from an input signal is described. The method includes receiving, by at least a processor, an input signal, wherein the input signal comprises at least a time-series sequence. The method further includes receiving, by the at least a processor, from a user interface, a user configuration data structure. The method further includes configuring, by the at least a processor, a signal processing module as a function of one or more signal processing parameters of the user configuration data structure. The method further includes filtering the input signal using the configured signal processing module to generate a filtered signal. The method further includes configuring, by the at least a processor, a comparator module as a function of one or more comparator parameters of the user configuration data structure. The method further includes generating a comparator output as a function of the configured comparator module, wherein the comparator module is configured to apply a plurality of boolean conditions to the filtered signal. The method further includes generating, by the at least a processor, a display data structure using the filtered signal and comparator output. The method further includes transmitting, by the at least a processor, the display data structure to a remote device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating a generating a display data structure from an input signal. A computing device may receive an input signal input source. A momentum processing module may be applied to input signal to generate a directional momentum signal. An autoregressive signal processing module may determine a filtered directional momentum signal from the directional momentum signal. A display data structure including a dynamic vector may be created using the filtered directional momentum signal.

Figure 1:
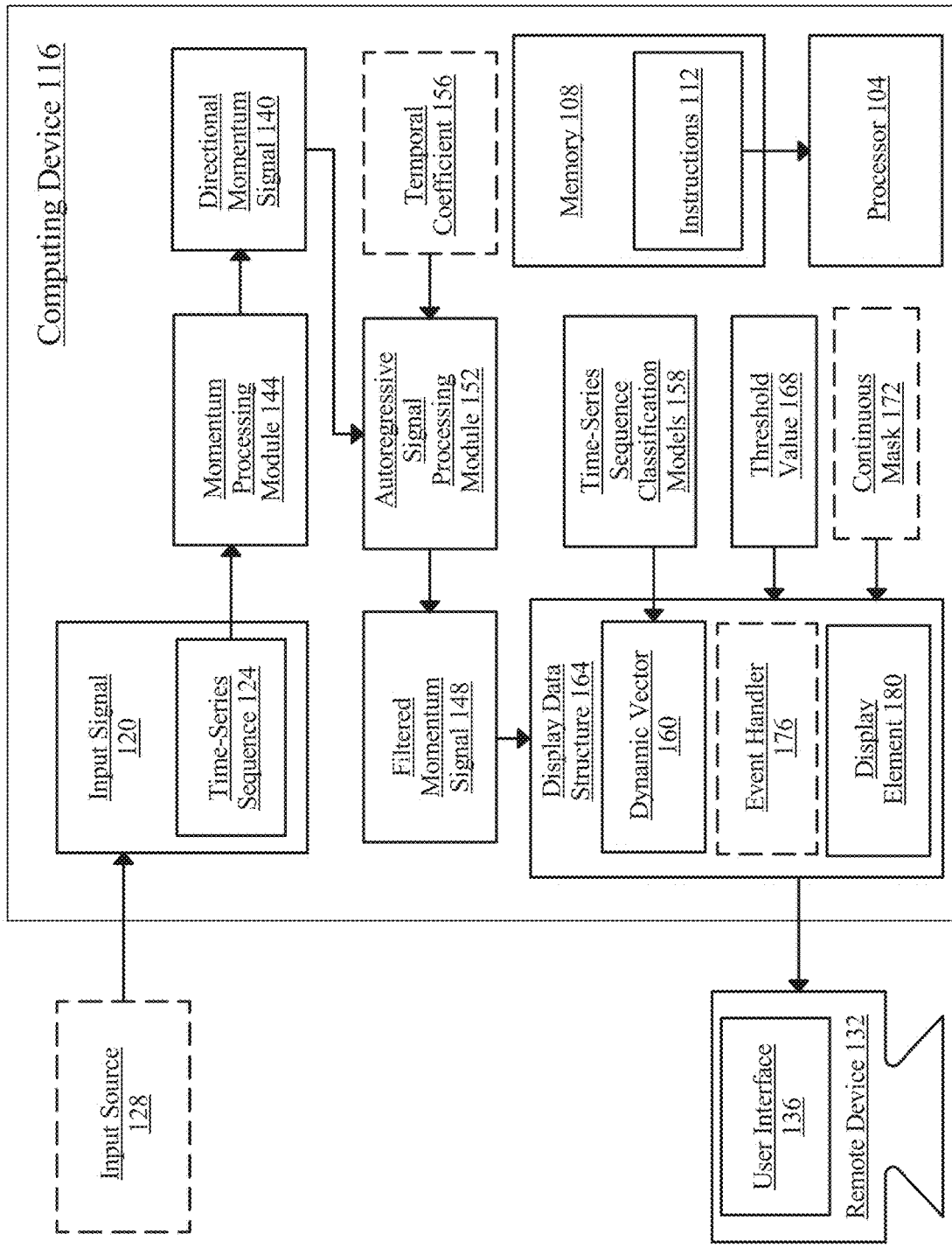
FIG. 1 is a diagram depicting an exemplary embodiment of an apparatus for generating a display data structure from an input signal.

Referring now to FIG. 1, an exemplary embodiment of an apparatus 100 for generating a display data structure from an input signal is illustrated. Apparatus 100 may include a computing device. Apparatus 100 may include a processor. Processor 104 may include, without limitation, any processor 104 described in this disclosure. Processor 104 may be included in a computing device 116. Computing device 116 may include any computing device 116 as described in this disclosure, including without limitation a microcontroller, microprocessor 104, digital signal processor 104 (DSP) and/or system on a chip (SoC) as described in this disclosure. Computing device 116 may include, be included in, and/or communicate with a mobile device such as a mobile telephone or smartphone. Computing device 116 may include a single computing device 116 operating independently, or may include two or more computing device 116 operating in concert, in parallel, sequentially or the like; two or more computing devices 116 may be included together in a single computing device 116 or in two or more computing devices 116. Computing device 116 may interface or communicate with one or more additional devices as described below in further detail via a network interface device. Network interface device may be utilized for connecting computing device 116 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices 116, and any combinations thereof. A network may employ a wired and/or a wireless mode of communication. In general, any network topology may be used. Information (e.g., data, software etc.) may be communicated to and/or from a computer and/or a computing device 116. Computing device 116 may include but is not limited to, for example, a computing device 116 or cluster of computing devices 116 in a first location and a second computing device 116 or cluster of computing devices 116 in a second location. Computing device 116 may include one or more computing devices 116 dedicated to data storage, security, distribution of traffic for load balancing, and the like. Computing device 116 may distribute one or more computing tasks as described below across a plurality of computing devices 116 of computing device 116, which may operate in parallel, in series, redundantly, or in any other manner used for distribution of tasks or memory between computing devices 116. Computing device 116 may be implemented, as a non-limiting example, using a "shared nothing" architecture.

With continued reference to FIG. 1, computing device 116 may be designed and/or configured to perform any method, method step, or sequence of method steps in any embodiment described in this disclosure, in any order and with any degree of repetition. For instance, computing device 116 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 116 may perform any step or sequence of steps as described in this disclosure in parallel, such as simultaneously and/or substantially simultaneously performing a step two or more times using two or more parallel threads, processor 104 cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, in some embodiments, apparatus 100 may include at least a processor 104 and a memory 108 communicatively connected to the at least a processor 104, the memory 108 containing instructions 112 configuring the at least a processor 104 to perform one or more processes described herein. Computing devices 116 including memory 108 and at least a processor 104 are described in further detail herein.

Still referring to FIG. 1, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, in some embodiments, apparatus 100 may receive a input signal 120 including a plurality of time-series sequences 124. In some embodiments, input signal may include an unstable process. As used herein, a "time-series sequence" is a plurality of data points indicating a value at multiple points in time. For the purposes of this disclosure, an "input signal," is a signal that is received into an electronic system. In some embodiments, a time-series sequence may include a pecuniary sequence. In some embodiments, a time-series sequence may include other sequence types such as sequences of popularity ratings over time, sequences of viewership ratings over time, and the like. As used herein, a "pecuniary sequence" is a series of data points that track a financial value over time. A pecuniary sequence may track, in non-limiting examples, a value of an equity, an item of debt such as a bond, a market cap, a value of a market, a value of a commodity, a value of a cryptocurrency, a value of a future interest, a financial instrument that tracks another value such as a market, and the like. Input signal 120 may include one time-series sequence 124. Input signal 120 may include a plurality of time-series sequences 124. For example, input signal 120 may include time-series sequences 124 within a particular category. Categories of time-series sequences include, in non-limiting examples, type (such as equity or debt), nationality, which exchange a time-series sequence is traded on, any relevant index that tracks financial instruments such as stocks, a year investment into a time-series sequence became available, and the like. In some embodiments, input signal 120 may include each time-series sequence 124 in a category. In non-limiting examples, input signal 120 may include time-series sequences 124 for each entity whose equity makes up the Dow Jones Industrial Average, or for each entity whose equity is traded on the New York Stock Exchange.

As used in this disclosure, a "signal" is any intelligible representation of data, for example from one device to another. A signal may include an optical signal, an electric signal, a digital signal, an analog signal, and the like. In some cases, a signal may be used to communicate with a computing device, for example by way of one or more ports. In some cases, a signal may be transmitted and/or received by a computing device for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

Still referring to FIG. 1, in some cases, apparatus 100 may perform one or more signal processing steps on a signal. For instance, apparatus 100 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

Still referring to FIG. 1, input signal 120 may be received from input source 128. Input source 128 may include, in non-limiting examples, memory 108, a database, a computing device associated with a database, and a financial institution that publishes financial data updates. In a non-limiting example, a financial institution may operate an application programming interface (API) and computing device 116 may request input signal 120 from the financial institution using the API. In some embodiments, computing device 116 may store input signal 120 locally. In some embodiments, computing device 116 may store input signal 120 locally and may request and/or receive replacement input signals 120 and/or updates to input signal 120 from input source 128.

Still referring to FIG. 1, apparatus 100 may request input signal 120 from input source 128 as a function of user inputs. In a non-limiting example, a user using remote device 132 may initiate a process described herein through an input into user interface 136. In this example, computing device 116 may request input signal 120 from input source 128 upon receiving a signal from remote device 132 initiating a process described herein. In a non-limiting example, a user input may include pressing a refresh button meant to update data displayed to a user. In some embodiments, a process described herein is performed in real time.

Still referring to FIG. 1, apparatus 100 may determine a directional momentum signal 140 as a function of one or more time-series sequences 124. As used herein, a "directional momentum signal" for the purposes of this disclosure, is a signal comprising information on the rate of change of a value.

With continued reference to FIG. 1, processor 104 may be configured to apply a momentum processing module 144 to input signal 120. A "momentum processing module," for the purposes of this disclosure is a module that calculates a directional momentum signal. In some embodiments, directional momentum signal 140 may include a momentum oscillator.

With continued reference to FIG. 1, momentum processing module 144 may include a momentum filter. A "momentum filter," for the purposes of this disclosure, is a filter that is configured to covert an input signal into a momentum signal.

With continued reference to FIG. 1, processor 104 may receive at least one directional momentum signal 140 for at least a time-series sequence 124 from momentum processing module 144. In some embodiments, time-series sequence 124 may be fed as input into momentum processing module 144 and directional momentum signal 140 may be received as output.

With continued reference to FIG. 1, momentum processing module 144 may apply a relative strength index to input signal 120 to determine directional momentum signal 140. In some embodiments, this may be done using a momentum filter, such as a relative strength index filter. A "relative strength index," for the purposes of this disclosure, is an index that evaluates the speed and magnitude of value changes. Relative strength index may be calculated using the following formula:

$$RSI=100-100/1+\text{average gain/average loss}$$

Average gain and average loss may be calculated using a look-back period. For example, average gain may look at the sum of gains over the past look-back period. For example, average loss May look at the sum of losses over the past look-back period. In some embodiments, the look back period may be greater than 1 day. In some embodiments, the look back period may be greater than 2 days. In some embodiments, the look back period may be 1-20 days. In some embodiments, the look back period may be 2-10 days. In some embodiments, the lookback period may be 2 days. In some embodiments, momentum processing module 144 may apply a chande momentum oscillator formula to input signal 120 to determine directional momentum signal 140. In some embodiments, momentum processing module 144 may apply a stochastic oscillator formula to input signal 120 to determine directional momentum signal 140. In some embodiments, momentum processing module 144 may apply a vortex indicator formula to input signal 120 to determine directional momentum signal 140. In some embodiments, momentum processing module 144 may apply an aroon oscillator formula to input signal 120 to determine directional momentum signal 140. In some embodiments, momentum processing module 144 may apply a Williams % Range formula to input signal 120 to determine directional momentum signal 140.

Still referring to FIG. 1, in some embodiments, one or more data smoothing techniques may be applied to time-series sequence 124 in order to produce directional momentum signal 140. In some embodiments, data smoothing techniques may be applied to directional momentum signals 140. Non-limiting examples of data smoothing methods include the randomization method, using a random walk, calculating a moving average, or using an exponential smoothing technique such as using an exponential moving average. A random walk method assumes that future values will be equal to the last available data point plus a random variable. Outliers may also be removed. Applying data smoothing techniques may limit variation when determining a directional momentum signal. This may produce more accurate data on average. For example, if data is highly varied, then taking an average of many data points may produce a better result than taking the value at a specific point, especially if that point lands on a peak or in a trough. In some embodiments, different data smoothing techniques may be applied to different time-series sequences 124, directional momentum signals 140, and/or segments of time-series sequences and directional momentum signals. In some embodiments, data smoothing techniques applied to different time-series sequences 124, directional momentum signals 140, and/or segments of time-series sequences and directional momentum signals may have different parameters. For example, short term, medium term, and long term dynamic vectors may be calculated based on data smoothed using a moving average. In this example, a long term dynamic vector may be calculated using a moving average that smooths data over a larger time span than a time span used to smooth data in order to calculate a short term dynamic vector.

With continued reference to FIG. 1, processor 104 may be configured to determine a filtered momentum signal 148. A "filtered momentum signal," for the purposes of this disclosure, is a momentum signal that has been fed through a filter in order to make the signal more useful for an intended purpose. Processor 104 is configured to apply an autoregressive signal processing module 152 to at least one directional momentum signal 140. An "autoregressive signal processing module," is a module that is configured to process a signal using an autoregression method. In some embodiments, autoregressive signal processing module 152 may include an autoregressive filter. An "autoregressive filter," for the purposes of this disclosure, is a filter whose current output depends on past values of the output. In some embodiments, autoregressive filter may include an infinite impulse response filter. For example, autoregressive filter may apply an autoregressive formula, such as:

$$FN_N = C_1 * FN_1 \pm C_2 * FN_2 + C_3 * FN_3 \pm \ldots \pm C_{N-1} FN_{N-1}$$

In some embodiments, the autoregressive filter may include the calculation of an exponential moving average (EMA). An EMA be calculated using a formula of:

$$EMA_N = \text{Value}(t) * k + EMA_{N-1} * (1-k)$$

Where k is:

$$k=2/P+1$$

P is the period of the EMA.

With continued reference to FIG. 1, as a non-limiting example, period may be anywhere from 12 hours to 180 days. As a non-limiting example, period may be anywhere from 2 days to 90 days. As a non-limiting example, period may be anywhere from 2 days to 90 days. As a non-limiting example, period may be anywhere from 30 days to 90 days. As a non-limiting example, period may be anywhere from 60 days to 90 days. As a non-limiting example, period may be 10 days. As a non-limiting example, period may be 30 days. As a non-limiting example, period may be 45 days. As a non-limiting example, period may be 89 days. As a non-limiting example, period may be 90 days.

With continued reference to FIG. 1, autoregressive signal processing module 152 may be configured to receive at least one directional momentum signal 140 and a temporal coefficient 156. A "temporal coefficient," for the purposes of this disclosure, is a value is used in and sets temporal restrictions on a signal processing module. As a non-limiting example, temporal coefficient 156 may include a period for an EMA, or a value k used in the calculation of EMA above. In some embodiments, a temporal coefficient may include a number of coefficients used in an autoregressive formula.

With continued reference to FIG. 1, autoregressive signal processing module 152 and/or autoregressive filter may include a triple exponential moving average (TEMA). TEMA may be calculated using the following formula:

$$TEMA = 3*EMA_1 - 3*EMA_2 + EMA_3$$

Where $EMA_1$ is an EMA, $EMA_2$ is the EMA of $EMA_1$, and $EMA_3$ is the EMA of $EMA_2$.

With continued reference to FIG. 1, in some embodiments, autoregressive signal processing module 152 and/or autoregressive filter may include a double exponential moving average. In some embodiments, autoregressive signal processing module 152 and/or autoregressive filter may include a quadruple exponential moving average.

With continued reference to FIG. 1, an autoregressive filter may include one or more filter taps. A "filter tap," for the purposes of this disclosure, is a coefficient used in a filter. In some embodiments, autoregressive filter may include 2 filter taps. In some embodiments, autoregressive filter may include 3 filter taps. In some embodiments, autoregressive filter may include 4 filter taps. In some embodiments, autoregressive filter may include 1-10 filter taps.

With continued reference to FIG. 1, autoregressive filter, momentum filter, and/or any other filter mentioned in this disclosure may be implemented using software or hardware components depending on the application required. Hardware filters may include components such as resistors, capacitors, inductors, op amps, and the like. These components may be assembled to attain the desired filtering performance. As a non-limiting example, a capacitor may be used as high-pass filter.

With continued reference to FIG. 1, autoregressive signal processing module 152 is configured to determine at least one filtered momentum signal 148 as a function of the at least one directional momentum signal 140 and the temporal coefficient 156. In some embodiments, filtered momentum signal 148 may be determined by inputting directional momentum signal 140 and temporal coefficient 156 into an autoregressive filter as disclosed above. In some embodiments, a TEMA may be calculated for directional momentum signal 140 using temporal coefficient 156 to determine filtered momentum signal 148.

With continued reference to FIG. 1, autoregressive signal processing module 152 may be further configured to receive a second temporal coefficient. In some embodiments, second temporal coefficient may be larger than temporal coefficient 156. As a non-limiting example, temporal coefficient 156 may be 30 days, whereas second temporal coefficient may be 90 days. A person of ordinary skill in the art would appreciate, after having reviewed the entirety of this disclosure that a variety of second temporal coefficients may be chosen. In some embodiments, autoregressive signal filter may be configured to determine a second filtered momentum signal as a function of the at least one directional momentum signal and the second temporal coefficient. In some embodiments, second filtered momentum signal may be used to create dynamic vector as described below.

With continued reference to FIG. 1, the application of autoregressive signal processing module 152 and momentum processing module 144 may allow input signal 120 to be reduced to a filtered momentum signal 148 from which a dynamic vector 160 can be produced. This is particularly useful because input signal 120 may include a non-stationary process. Non-stationary processes are notoriously hard to analyze. This novel application of autoregressive signal processing module 152 and momentum processing module 144 allows for the analysis of unstable processes. Without this application the conclusions enabled by dynamic vector may be arcane and impossible to deduce. Additionally, the use of display data structure allows for these deductions to be presented to users in an organized manner. Particularly, the use of event handlers, allows for the data structure to respond to changes in dynamic vector 160 to change what is to be displayed.

With continued reference to FIG. 1, various filter parameters of autoregressive filter and/or momentum filter may be determined using one or more machine-learning modules. As a non-limiting example, filter parameters may include coefficient weights, number of taps, temporal coefficient 156, and the like. In some embodiments, a filter machine-learning model may be used to tune filter parameters. In some embodiments, filter machine-learning model may be trained using filter training data. Filter training data may include correlations between directional momentum signals, filter parameters, and filtered momentum signals. As a non-limiting example, feedback may be used to train a filter machine-learning model. For example, real-world data may be used to evaluate the accuracy of filtered momentum signal. For example, a high value for a filtered momentum signal may indicate beneficial economic conditions. If filtered momentum signal indicates beneficial economic conditions, but real-world (later collected) data bears out that economic conditions were negative, or neutral, this set of data may be removed from training data, assigned a lesser weight, or the like. In some embodiments, the real-world data may be substituted for the filtered momentum signal and this new correlation may be used to train filter machine-learning model.

With continued reference to FIG. 1, apparatus 100 may be configured to form a dynamic vector 160. As used herein, a "dynamic vector" is a data structure including a measurement of sentiment based on one or more filtered momentum signals or directional momentum signals. Apparatus 100 is configured to generate a display data structure 164 using the at least one filtered momentum signal 148 and a plurality of threshold values 168. For the purposes of this disclosure, a "display data structure," is a data structure that is configured to cause a computing device to display information. Display data structure 164 may include vectors, arrays, hash tables, dictionaries, decision trees, arrays, matrices, and the like. In some embodiments, display data structure 164 may include one or more instances of code for execution on a computing device, such as a remote device.

With continued reference to FIG. 1, in some embodiments, generating the display data structure 164 comprises forming a dynamic vector 160 using the at least one filtered momentum signal 148 and a plurality of threshold values 168. In some embodiments, processor 104 may compare filtered momentum signal 148 to plurality of threshold values 168. In some embodiments, processor 104 may compare a datum from filtered momentum signal 148 to plurality of threshold values 168. As a non-limiting example, threshold values 168 may include upper and lower threshold values. As a non-limiting example, if datum from filtered momentum signal 148 is below a lower threshold, dynamic vector 160 may include a sentiment of "bad," "negative," "bear" or the like. As a non-limiting example, if datum from filtered momentum signal 148 is above an upper threshold, dynamic vector 160 may include a sentiment of "good," "positive," "bull" or the like. In some embodiments, the datum from filtered momentum signal 148 that is used in the comparison may be the latest (in time) datum within filtered momentum signal 148.

Still referring to FIG. 1, in some embodiments, threshold value 168 may include one or more dynamic boundary values. In some embodiments, computing device 116 may determine pair of dynamic boundary values. In some embodiments, pair of dynamic boundary values may be determined as a function of a volatility of a set of historical time-series sequences. A set of historical time-series sequences may include, for example, historical time-series sequences with attributes that are similar to a time-series sequence 124 of interest. In a non-limiting example, if time-series sequence 124 is associated with a value of a particular stock, then a set of historical time-series sequences may include recent data on stocks of similarly sized companies in the same industry. Non-limiting examples of methods of measuring volatility include finding a variance, a standard deviation, a standard deviation over a mean, an average change over a certain time period, and the like. In some embodiments, data relating to historical time-series sequences may be normalized, such as by expressing all changes in value as percent changes. In some embodiments, computing device 116 may identify one or more dynamic boundary values as a function of a volatility of a set of historical time-series sequences. In a non-limiting example, if a set of historical time-series sequences is highly volatile, then dynamic boundary values may be set such that only large changes in time-series sequence 124 value leads to a particular dynamic vector 160 result. In another non-limiting example, a dynamic boundary value marking a boundary between a neutral outlook and a positive outlook may be determined as a multiple of a standard deviation, a multiple of a standard deviation over a mean, a multiple of a variance, a multiple of an average daily change, and the like. In a non-limiting example, a positive multiple of a standard deviation of points in time-series sequence 124 within the past year may be used as a first dynamic boundary value, and a second dynamic boundary value may be the first dynamic boundary value multiplied by −1, such that time-series sequences 124 with high standard deviations have a wider margin between the first and second dynamic boundary values than time-series sequences 124 with low standard deviations. In some embodiments, a formula used to determine dynamic boundary values may vary with time-series sequence 124 category. For example, different multipliers may be applied to measures of variance in different industries. In some embodiments, processor may identify dynamic boundary value and/or a variable used to calculate dynamic boundary value in a source such as memory 108, a database, and/or a lookup table.

With continued reference to FIG. 1, selection of boundary values using the volatility of time-series data allows for better selection of boundary values such that a more volatile time-series data is not erroneously classified. Some data may naturally have greater fluctuations, which should be accounted for automatically when selecting boundary values.

Still referring to FIG. 1, in some embodiments, computing device 116 may determine one or more dynamic boundary values using a plurality of time-series sequence classification models 158. As used in this disclosure, a "time-series sequence classification model" is a computational model or algorithm designed to analyze and categorize time-series sequence and inform an end user on how system resources should be allocated based on the analysis and the categorization of the time-series sequence. In some embodiments, each time-series sequence classification model of the plurality of time-series sequence classification models may include a classifier. In some cases, one or more time-series sequence classification model may be trained on time-series sequence classification model training data. Time-series sequence classification model training data may include example time-series sequences, associated with example dynamic vectors. Time-series sequence classification model training data may be obtained by, in a non-limiting example, gathering estimates of investor sentiment toward a particular financial instrument at a particular time and an associated time-series sequence. In some embodiments, sentiment data may be gathered using a web crawler. Web crawlers are described below. Once time-series sequence classification model is trained, a classification boundary of time-series sequence classification model may be used as dynamic boundary value.

Still referring to FIG. 1, in some embodiments, plurality of time-series sequence classification models may be trained on, and may accept as inputs, directional momentum signals 140. For example, time-series sequence classification model training data may include example directional momentum signals, associated with example dynamic vectors.

Still referring to FIG. 1, individual data points within time-series sequence classification model inputs may be associated with example dynamic vectors. For example, in a time-series sequence classification model trained on example time-series sequences, each data point within an example time-series sequence may be associated with an example dynamic vector, rather than the entire time-series sequence being associated with a single example dynamic vector. For example, time-series sequence classification model training data may include an example time-series sequence including a first value at a first point in time and a second value at a second point in time, then the training data may include a first example dynamic vector associated with the first value at the first point in time and the training data may also include a second example dynamic vector associated with the second value at the second point in time. In another example, in a time-series sequence classification model trained on example directional momentum signals, each example directional momentum signal of the directional momentum signals may be associated with an example dynamic vector.

Still referring to FIG. 1, in some embodiments, determining dynamic vector 160 may include inputting into plurality of time-series sequence classification models time-series sequence 124 and receiving as outputs from time-series sequence classification model at least one dynamic vector 160. In some embodiments, time-series sequence classification model may include a plurality of classification boundaries. In a non-limiting example, time-series sequence classification model may classify time-series sequence 124 into a category of at least 3 categories.

Still referring to FIG. 1, in some embodiments, plurality of time-series sequence classification models may be trained on additional factors. For example, time-series sequence classification model training data may include example movement of one or more associated financial instruments. For example, if time-series sequence 124 represents values of debt from an entity that pays out after 5 years, then movement or values of debt from the entity that pays out after 10 years may be indicative of sentiment toward time-series sequence 124 and such similar financial instruments may be included in time-series sequence classification model training data. In this example, each time-series sequence classification model of plurality of time-series sequence classification model may accept as an input values or movement of similar financial instruments. In another example, time-series sequence classification model training data may include example polling data on consumer or investor confidence. In this example, time-series sequence classification model may accept as an input polling data on consumer or investor confidence from the relevant time frame. Similarly, time-series sequence classification model may also take into account inflation data, unemployment data, interest rates, changes in time-series sequence 124 over multiple time frames, analyst ratings of financial instruments, a location of a headquarters of an entity associated with time-series sequence 124, and the like. In this way, time-series sequence classification model may produce one or more classification boundaries that take into account the relevant available information such that dynamic vector 160 may be accurately determined.

Still referring to FIG. 1, in some embodiments, filtered momentum signal 148 may be segmented, using time-series sequence classification models, into one or more dynamic vectors 160 e.g., distinct categories such as, without limitation, "negative," "natural," and "positive;" each category corresponds to a specific market condition, which may be essential for making informed investment decisions. As a non-limiting example, plurality of time-series sequence classification models may include a plurality of investment models. An "investment model," for the purpose of this disclosure, is a framework that dictates how financial resources should be allocated based on the time-series sequence and/or the dynamic vector. In some cases, investment models may provide insights related to optimal investment strategies. In an embodiment, plurality of investment models may include one or more conservative investment models that employ conservative strategies; for instance, and without limitation, allocation of financial resources may be heavily favor bonds or other low-risk assets, aiming to preserve capital and minimize exposure to market volatility. In another embodiment, plurality of investment models may include one or more balanced investment models that employ balanced strategies; for instance, and without limitation, one or more conservative investment models may recommend to acquire a mix of equities and fixed-income assets that provide both growth potential and stability for the end users. In a further embodiment, plurality of investment models may include an aggressive investment model that employ aggressive strategies; for instance, and without limitation, for a "positive" dynamic vector, such investment models may involve higher allocations to equities, sector-specific investments, or any other aggressive actions on favorable market conditions.

Still referring to FIG. 1, in some embodiments, a user may wish to determine dynamic vector 160 as a function of a subset of the above factors. In some embodiments, apparatus 100 may retrieve up to date values for relevant factors in real time. In some embodiments, apparatus 100 may use default values for factors not to be considered. This may allow a more complex dynamic boundary value to be used when values for fewer variables are available. In some embodiments, a plurality of time-series sequence classification models may be trained. In some embodiments, computing device 116 may be configured to identify a particular time-series sequence classification model from a plurality of time-series sequence classification models as a function of user input. In a non-limiting example, a user may input into user interface 136 an instruction to only consider time-series sequence 124 data from within the past year. In this example, a first time-series sequence classification model may accept as an input time-series sequence 124 data from the past year, and a second time-series sequence classification model may accept as an input time-series sequence 124 data from the past 2 years, and dynamic boundary values from the first time-series sequence classification model may be selected.

Still referring to FIG. 1, in some embodiments, a plurality of dynamic vectors 160 may be calculated. This may be done, for example, by inputting different sets of data into one or more time-series sequence classification models. For example, a first time-series sequence classification model may focus on long term performance and may accept time-series sequence 124 from the past 5 years, and a second time-series sequence classification model may focus on short term performance and may accept time-series sequence 124 from the past month. In this example, it may be possible to generate a plurality of dynamic vectors 160 with the same or different values. For example, if time-series sequence 124 has performed well over the past 5 years, but poorly over the past month, then differing dynamic vector 160 values may be produced. In some embodiments, one or more dynamic vectors 160 may be calculated from one or more time-series sequences 124 of a plurality of time-series sequences 124, where the dynamic vectors 160 are calculated from time-series sequences 124 within a certain pecuniary category. A pecuniary category may include, in non-limiting examples, time-series sequences 124 associated with entities in a particular industry, over a certain time frame, or of a certain size. In some embodiments, time-series sequence 124 may be truncated in order to produce a directional momentum signal with a specific time frame and/or a dynamic vector 160 relevant to that time frame. A plurality of time-series sequence 124 truncations may be used in order to produce data with different time frames. In non-limiting examples, time-series sequence 124 may be truncated such that data from the past 20 years, 10 years, 5 years, 2 years, 1 year, 6 months, 3 months, 1 month, 2 weeks, 1 week, or 1 day is retained. In a non-limiting example, a short term directional momentum signal and dynamic vector 160 may use 1 week of time-series sequence 124 data, a medium term directional momentum signal and dynamic vector 160 may use 1 year of time-series sequence 124 data, and a long term directional momentum signal and dynamic vector 160 may use 10 years of time-series sequence 124 data.

Still referring to FIG. 1, in some embodiments, volatility may be handled differently across different time frames. For example, more aggressive data smoothing may be used when determining long term data than short term data. In another example, data may be normalized when determining long term data such that short term volatility, not overall growth, is the primary factor when assessing a standard deviation.

Still referring to FIG. 1, a dynamic vector 160 may be calculated from time-series sequence 124 data that is current or is not current. For example, dynamic vector 160 may be determined as a function of a change in a time-series sequence from a first time point to a second time point, where neither time point is current. This may be done, for example, to identify dynamic vector 160 from the relevant time period. This may allow for comparison of dynamic vector 160 with data from the relevant time period or from after the relevant time period, which may be used to improve processes for determining dynamic vector 160. For example, a plurality of dynamic boundary values may be calculated based on a plurality of sets of time-series sequence classification model training data and resulting dynamic vectors 160 may be compared to sentiment estimates of the relevant time period in order to identify a training data set and/or algorithm that produces the best dynamic boundary values. For example, a plurality of training data sets and/or algorithms may be tested, and data and/or algorithms that are efficient and closely match sentiment estimates may be used. In some embodiments, this process may be automated such that it takes into account predictable releases of data from governments or other sources. In some embodiments, reinforcement learning may be used to improve time-series sequence classification model. A cost function used in such reinforcement learning may be based on, for example, external measurements of sentiment towards a particular time-series sequence and how closely they match a dynamic vector 160 produced using methods described herein.

Still referring to FIG. 1, in some embodiments, apparatus 100 may determine dynamic vector 160 as a function of at least one directional momentum signal and/or at least one dynamic vector 160. In some embodiments, apparatus 100 may determine dynamic vector 160 as a function of one or more directional momentum signals and may aggregate at least one dynamic vector 160 to form dynamic vector 160. As used herein, a "dynamic vector" is a measurement of sentiment based on one or more directional momentum signals. In non-limiting examples, dynamic vector 160 may indicate a bearish sentiment, a neutral sentiment, or a bullish sentiment toward a particular entity, market, or time-series sequence. In some embodiments, dynamic vector 160 may be indicative of sentiment toward an entire market or subset of a market such as a particular stock. In a non-limiting example, time-series sequence 124 may represent a stock price over time, and dynamic vector 160 determined based on time-series sequence 124 may include an assessment of sentiment toward that stock. In some embodiments, dynamic vector 160 may be determined as a function of a plurality of dynamic vectors 160. For example, dynamic vector 160 may estimate sentiment toward a particular cryptocurrency and may be based on a plurality of dynamic vectors 160 which are calculated based on changes in time-series sequence 124 over differing lengths of time. For example, such a plurality of dynamic vectors 160 may include a first dynamic vector 160 calculated based on a change in time-series sequence over the past month, a second dynamic vector 160 calculated based on a change in time-series sequence over the past 6 months, and a third dynamic vector 160 calculated based on a change in time-series sequence over the past 2 years. Dynamic vector 160 may be calculated as a function of a plurality of dynamic vectors 160, such as by a count of how many of them are positive, how many of them are negative, a sum of their values, a weighted sum of their values, or another formula. Dynamic vector 160 may be calculated using fuzzy inferencing techniques. Fuzzy inferencing techniques are described further below. Fuzzy inferencing techniques may be used to make inferences between directional momentum signals within directional momentum signal in order to produce a dynamic vector.

With continued reference to FIG. 1, in some embodiments, generating display data structure 164 comprises applying a continuous mask 172 to dynamic vector 160. For the purposes of this disclosure, a "continuous mask" is a data transformation process that maps dynamic vector to a set of continuous values along a spectrum. In some embodiments, continuous mask 172 may map dynamic vector to a continuum. In some embodiments, continuous mask 172 may map dynamic vector to an angular continuum. In some embodiments, angular continuum may include angles on a continuum of 0-90 degrees. In some embodiments, angular continuum may include angles on a continuum of 0-180 degrees. In some embodiments, angular continuum may include angles on a continuum of 0-360 degrees. In some embodiments, dynamic vector 160 may include a value on a range of 0-3, this range may be mapped to an angular continuum with a range of 0-180 degrees. In some embodiments, continuous mask 172 may be retrieved from a database.

With continued reference to FIG. 1, additionally, or alternatively, display data structure 164 may be generated by mapping dynamic vector 160 to at least a time-series sequence classification model of plurality of time-series sequence classification models based on plurality of threshold values 168 as described above. In one or more embodiments, mapping of dynamic vector 160 to at least a time-series sequence classification model may be based on the classification result e.g., categories such as, without limitation, "negative," "natural," and "positive" that associated with specific time-series sequence classification models. As a non-limiting example, display data structure may incorporate visual details of recommended investment models (i.e., time-series sequence classification models) based on the market condition (i.e., dynamic vector 160). In some cases, visual details may include, without limitation, displayed information on asset allocation, specific investment instruments (e.g., bonds, equities, sector funds, and/or the like). In some cases, display data structure 164 may help user understand the basis of the classification. In some cases, indicators for different levels of risk or confidence may also be included. In some cases, time-series sequence 124 (or filtered momentum signal 148) may be classified into dynamic vector 160 based on plurality of threshold values, wherein each threshold value of plurality of threshold values 168 may be dynamically determined based on historical data and market volatility. Processor 104 may be configured to compare dynamic vector 160 with each threshold value of plurality of threshold values 168; for instance, and without limitation, each time-series sequence classification model of plurality of time-series sequence classification models may be associated with a different range of threshold values. Processor 104 may map a dynamic vector to one or more time-series classification models if such dynamic vector fall within the threshold value range associated with the models. As a non-limiting example, a "positive" dynamic vector, classified based on closing prices of a stock over the past year may be mapped to an aggressive investment model. A display data structure may be created, including a gauge showing a "positive" indicator, a list of recommended high-equity investments, threshold values used in the classification may be created as described in further detail with reference to FIG. 9. Additionally, or alternatively, apparatus 100 as described herein may be configured to automatically execute, for example, one or more trades based on the mapped investment models via one or more APIs of corresponding trading platforms.

With continued reference to FIG. 1, display data structure 164 may include an event handler 176. For the purposes of this disclosure, an "event handler" is a routine that is configured to execute a block of code upon detection of an event. Event handler 176 may alter data within display data structure 164 upon occurrence of an event. In some embodiments, event handler 176 may be triggered by detection of a user input. In some embodiments, event handler 176 may be triggered by detection of a user clicking a button. In some embodiments, event handler 176 may be triggered by detection of a user keyboard input. In some embodiments, event handler 176 may include an event listener. For the purposes of this disclosure, an "event listener" is a program that is configured to detect an event for an event handler. Event listener, as non-limiting example, may detect button presses, elapsed time, keyboard presses, mouse movement, voice commands, and the like.

With continued reference to FIG. 1, display data structure 164 may include an allocation event handler. Allocation event handler may perform various allocations based on dynamic vector 160. "Allocation event handler," for the purposes of this disclosure, is an event handler that is configured to allocate assets. As a non-limiting example, allocation event handler may cause the purchase and or sale of bonds or treasury bills as a function of dynamic vector 160. As a non-limiting example, allocation event handler may cause the purchase and or sale of stocks, mutual funds, or the like as a function of dynamic vector 160. In some embodiments, allocation event handler may be triggered by a change in or update of dynamic vector 160. In some embodiments, allocation event handler may interface with an API in order to carry out allocations as required.

With continued reference to FIG. 1, in some embodiments, display data structure 164 may include a display element 180. A "display element," for the purposes of this disclosure, is a visual element configured to be displayed on a device. Exemplary display elements 180 are further described with respect to FIGS. 6-8. In some embodiments, display element 180 may include a gauge display element. A "gauge display element," for the purposes of this disclosure, is a display element that displays data using a meter orientation. In some embodiments, gauge display element may include a gauge reading element. A "gauge reading element," for the purposes of this disclosure, is a visual element of a gauge display element that indicates a value to a user. As a non-limiting example, the arrow in FIG. 8 may be a gauge reading element. Gauge reading element may include an arrow, a bar, a wedge, a dot, and the like. In some embodiments, gauge reading element may be located as a function of dynamic vector. In some embodiments gauge reading element may include a gauge reading element orientation. In some embodiments, gauge reading element may be located at a gauge reading element orientation. In some embodiments, gauge reading element orientation may include an angle. In some embodiments, gauge reading element orientation may include an angle between 0-180 degrees. In some embodiments, gauge reading element orientation may be determined from dynamic vector 160. In some embodiments, gauge reading element orientation may be determined from dynamic vector 160. In some embodiments, gauge reading element orientation may be determined from continuous mask 172 as applied to dynamic vector 160. As a non-limiting example, if continuous mask 172 outputs a value of 120 degrees, gauge reading element orientation may be set to 120 degrees. In some embodiments, gauge display element may be configured to display a set of continuous values using the gauge reading element. As a non-limiting example, a gauge reading element may be used to display or point to a particular continuous value in order to display said continuous value.

With continued reference to FIG. 1, in some embodiments, event handler 176 may include a color event handler. A "color event handler," for the purposes of this disclosure is an event handler that is configured to determine a color of a display element as a function of an event. As a non-limiting example, color event handler may be configured to look up a value within dynamic vector in a color look up table, wherein the color look up table relates dynamic vector values to colors. As a non-limiting example, values of 0-1 for dynamic vector may be associated with red. As a non-limiting example, values of 1-3 for dynamic vector may be associated with yellow. As a non-limiting example, values of 3-4 for dynamic vector may be associated with green. In some embodiments, output of continuous mask 172 may be associated colors within a lookup table that may be accessed by color event handler.

With continued reference to FIG. 1, in some embodiments, color event handler may be configured to determine a color using a color mask. A "color mask," for the purposes of this disclosure, is a data transformation process that maps data to a color value. As a non-limiting example, color value may be expressed using RGB value, a hex code, and the like. As a non-limiting example, a low value of dynamic vector 160 may be mapped to a low R value, whereas a high value of dynamic vector 160 may be mapped to a high R value.

With continued reference to FIG. 1, in some embodiments, display data structure 164 may include a temporal element. A "temporal element" for the purposes of this disclosure is an element that indicates a time value. As a non-limiting example, temporal element may include the number of days that dynamic vector has maintained its current category. In some embodiments, temporal element may be a function of a change in dynamic vector; as a non-limiting example, temporal element may include the number of days that a dynamic vector has remained in the same category since a category change. In some embodiments, historical dynamic vectors may be used to calculate temporal element. In some embodiments historical dynamic vectors may be retrieved from a historical data database.

With continued reference to FIG. 1, in some embodiments, display data structure 164 may include a graphical element. A "Graphical element," for the purposes of this disclosure is an element of display data structure 164 that causes a remote device to display a graph. As a non-limiting example, graphical element may include a scatter plot. As a non-limiting example, graphical element may include a histogram. As a non-limiting example, graphical element may include a bar plot. As a non-limiting example, graphical element may include a line graph. As a non-limiting example, graphical element may include a pie chart. In some embodiments, graphical element may include filtered momentum signal 148. As a non-limiting example, graphical element may include threshold values 168. In some embodiments, is may be configured to cause the remote device to display the graphical element, wherein displaying the graphical element comprises overlaying the plurality of threshold values 168 on top of the at least one filtered momentum signal 148. An exemplary embodiment of a displayed graphical element may be found in FIG. 6.

Still referring to FIG. 1, apparatus 100 is configured to transmit display data structure to a remote device 132. Display data structure is configured to cause remote device 132 to display dynamic vector 160. In some embodiments, display data structure be configured to cause remote device 132 to display one or more display elements as disclosed above. Apparatus 100 may configure a remote device 132 to display dynamic vector 160 as a state-indicative visual element through display data structure. In some embodiments, a state-indicative visual element may include a state-indicative representation of a dial. In some embodiments, computing device 116 may communicate a visual element data structure including a visual element to remote device 132. In some embodiments, display data structure 164 may include a state-indicative visual element.

Still referring to FIG. 1, in some embodiments, a visual element data structure may include a visual element. In some embodiments, a display element may include a visual element. As used herein, a "visual element" is a representation of data that is displayed visually to a user. In some embodiments, a visual element data structure may include a rule for displaying visual element. In some embodiments, a visual element data structure may be determined as a function of dynamic vector 160. In some embodiments, a visual element data structure may be determined as a function of an item from the list consisting of input source 128, input signal 120, time-series sequence 124, time-series sequence classification model training data, one or more attributes of time-series sequence classification model, dynamic boundary value, directional momentum signal, directional momentum signal 140, dynamic vector 160, and dynamic vector 160. In a non-limiting example, a visual element data structure may be generated such that visual element describing or highlighting dynamic vector 160 is displayed to a user. For example, a visual element may include a dial indicating a value of dynamic vector 160.

Still referring to FIG. 1, in some embodiments, visual element may include one or more elements of text, images, shapes, charts, particle effects, interactable features, and the like. For example, a state indicative dial may include text identifying each state on the dial.

Still referring to FIG. 1, a visual element data structure may include rules governing if or when visual element is displayed. In a non-limiting example, a visual element data structure may include a rule causing a visual element describing dynamic vector 160 to be displayed when a user selects dynamic vector 160 using a graphical user interface (GUI).

Still referring to FIG. 1, a visual element data structure may include rules for presenting more than one visual element, or more than one visual element at a time. In an embodiment, about 1, 2, 3, 4, 5, 10, 20, or 50 visual elements are displayed simultaneously.

Still referring to FIG. 1, a visual element data structure rule may apply to a single visual element or datum, or to more than one visual element or datum. A visual element data structure may categorize data into one or more categories and may apply a rule to all data in a category, to all data in an intersection of categories, or all data in a subsection of a category (such as all data in a first category and not in a second category). For example, a plurality of directional momentum signals used to calculate dynamic vector 160 may be treated in the same way. A visual element data structure may rank data or assign numerical values to them. For example, positive dynamic vectors 160 may be shown above negative dynamic vectors 160. A numerical value may, for example, measure the degree to which a first datum is associated with a category or with a second datum. For example, a numerical value indicating how close a directional momentum signal is to a dynamic boundary value. A visual element data structure may apply rules based on a comparison between a ranking or numerical value and a threshold. For example, all directional momentum signals below a dynamic boundary value may be displayed in red text. Rankings, numerical values, categories, and the like may be used to set visual element data structure rules. Similarly, rankings, numerical values, categories, and the like may be applied to visual elements, and visual elements may be applied based on them. For example, a plurality of visual elements may be generated, with importance ratings assigned to each, and only the most important visual elements are displayed.

Still referring to FIG. 1, in some embodiments, visual element may be interacted with. For example, visual element may include an interface, such as a button or menu. In some embodiments, visual element may be interacted with using a user device or remote device such as a smartphone.

Still referring to FIG. 1, in some embodiments, apparatus 100 may transmit visual element data structure to remote device 132. In some embodiments, apparatus 100 may include at least a processor 104 and a memory 108 communicatively connected to the at least processor 104, the memory 108 containing instructions 112 configuring the at least processor 104 to transmit visual element data structure to remote device 132. In some embodiments, visual element data structure may configure remote device 132 to display visual element. In some embodiments, visual element data structure may cause an event handler to be triggered in an application of remote device 132 such as a web browser. In some embodiments, triggering of an event handler may cause a change in an application of remote device 132 such as display of visual element.

Still referring to FIG. 1, in some embodiments, apparatus 100 may transmit visual element to a display. A display may communicate visual element to user. A display may include, for example, a smartphone screen, a computer screen, or a tablet screen. A display may be configured to provide a visual interface. A visual interface may include one or more virtual interactive elements such as, without limitation, buttons, menus, and the like. A display May include one or more physical interactive elements, such as buttons, a computer mouse, or a touchscreen, that allow user to input data into the display. Interactive elements may be configured to enable interaction between a user and a computing device. In some embodiments, a visual element data structure is determined as a function of data input by user into a display.

Still referring to FIG. 1, a variable and/or datum described herein may be represented as a data structure. In some embodiments, a data structure may include one or more functions and/or variables, as a class might in object-oriented programming. In some embodiments, a data structure may include data in the form of a Boolean, integer, float, string, date, and the like. In a non-limiting example, a visual element data structure may include a string value representing text to be displayed as part of a visual element. In some embodiments, data in a data structure may be organized in a linked list, tree, array, matrix, tenser, and the like. In a non-limiting example, elements of time-series sequence 124 data may be organized in a list. In some embodiments, a data structure may include or be associated with one or more elements of metadata. A data structure may include one or more self-referencing data elements, which processor 104 may use in interpreting the data structure. In a non-limiting example, a data structure may include "<date>" and "</date>," tags, indicating that the content between the tags is a date.

Still referring to FIG. 1, a data structure may be stored in, for example, memory 108 or a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, in some embodiments, a data structure may be read and/or manipulated by processor 104. In a non-limiting example, a dynamic boundary value data structure may be read and used to determine dynamic vector 160.

Still referring to FIG. 1, in some embodiments, a data structure may be calibrated. In some embodiments, a data structure may be trained using a machine learning algorithm. In a non-limiting example, a data structure may include an array of data representing the biases of connections of a neural network. In this example, the neural network may be trained on a set of training data, and a back propagation algorithm may be used to modify the data in the array. Machine learning models and neural networks are described further herein.

Still referring to FIG. 1, in some embodiments, a variable described herein may be converted into a different form. Data formats may be converted in a variety of ways, such as without limitation, using a speech to text function or using optical character recognition. In some embodiments, a variable described herein may be converted into a different form such that it is in a form appropriate for input into a function. As a non-limiting example, time-series sequence classification model may only accept inputs in a particular format, and time-series sequence 124 may be converted into that format such that it may be effectively input into time-series sequence classification model.

Still referring to FIG. 1, in some embodiments, a web crawler may be used to obtain data such as sentiment data. As used herein, a "web crawler" is a program that systematically browses the internet for the purpose of web indexing. The web crawler may be seeded with platform URLs, wherein the crawler may then visit the next related URL, retrieve the content, index the content, and/or measures the relevance of the content to the topic of interest. In one embodiment, the web crawler may be configured to scrape sentiment data from websites, such as websites commonly visited by investors, social media platforms and networking platforms. In some embodiments, a web crawler may be configured to generate a web query. A web query may include search criteria. Search criteria may include, for example, keywords such as stock tickers, names of entities, and website addresses where relevant data is likely to be found. A web crawler function may be configured to search for and/or detect one or more data patterns. A "data pattern" as used in this disclosure is any repeating forms of information.

Still referring to FIG. 1, in some embodiments, a web crawler may work in tandem with a program designed to interpret information retrieved using a web crawler. As a non-limiting example, a machine learning model may be used to generate a new query as a function of prior search results. As another non-limiting example, data may be processed into another form, such as by using optical character recognition to interpret images of text. In some embodiments, a web crawler may be configured to determine the relevancy of a data pattern. Relevancy may be determined by a relevancy score. A relevancy score may be automatically generated by processor 104, received from a machine learning model, and/or received from a user. In some embodiments, a relevancy score may include a range of numerical values that may correspond to a relevancy strength of data received from a web crawler function. As a non-limiting example, a web crawler function may search the Internet for data related to investor sentiment toward a particular entity. In some embodiments, computing device may determine a relevancy score of data retrieved by a web crawler.

Figure 2:
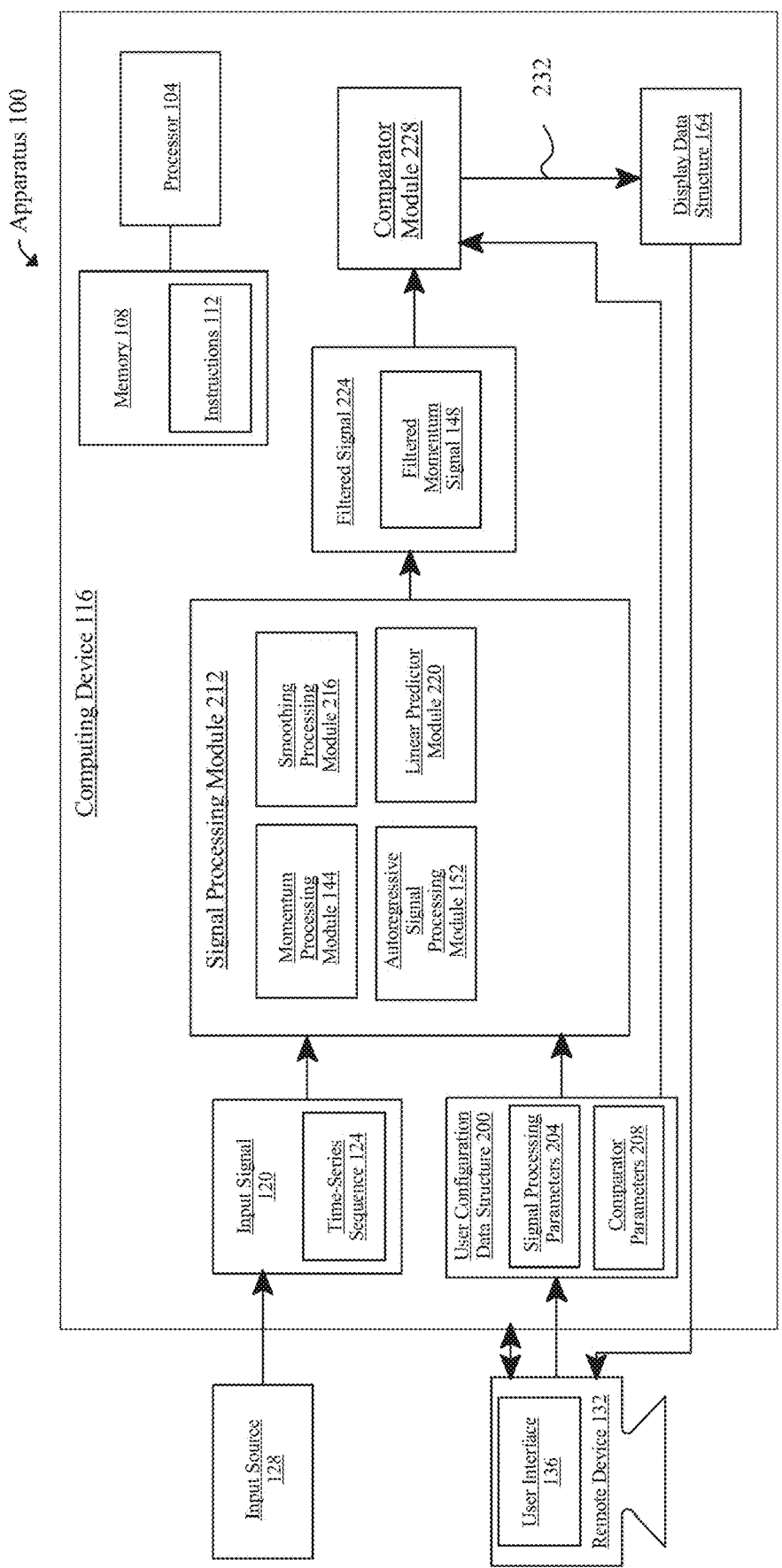
FIG. 2 is a diagram depicting another exemplary embodiment of an apparatus for generating a display data structure from an input signal.

Referring now to FIG. 2, another exemplary embodiment of apparatus 100 is illustrated. In some embodiments, memory 108 may include instructions 112 configuring at least a processor 104 to receive, from user interface 136, a user configuration data structure 200. A "user configuration data structure," for the purposes of this disclosure is a data structure that includes one or more parameters from the user that configure the apparatus.

With continued reference to FIG. 2, user configuration data structure 200 may include one or more vectors. A "vector" as defined in this disclosure is a data structure that represents one or more quantitative values and/or measures. Such vector and/or embedding may include and/or represent an element of a vector space; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l = \sqrt{\sum_{i=0}^{n} a_i^2}$, where ai is attribute number i of the vector. Scaling and/or normalization may function to make vector comparison independent of absolute quantities of attributes, while preserving any dependency on similarity of attributes. A two-dimensional subspace of a vector space may be defined by any two orthogonal vectors contained within the vector space. Two-dimensional subspace of a vector space may be defined by any two orthogonal and/or linearly independent vectors contained within the vector space; similarly, an n-dimensional space may be defined by n vectors that are linearly independent and/or orthogonal contained within a vector space. A vector's "norm" is a scalar value, denoted $\|a\|$ indicating the vector's length or size, and may be defined, as a non-limiting example, according to a Euclidean norm for an n-dimensional vector a as:

$$\|a\| = \sqrt{\sum_{i=0}^{n} a_i^2}$$

In an embodiment, and with continued reference to FIG. 1, each element of user configuration data structure 200 may be represented by a dimension of a vector space; as a non-limiting example, each element of a vector may include a number representing an enumeration of co-occurrences of first element of user configuration data structure 200 represented by the vector with second element of user configuration data structure 200. Alternatively, or additionally, dimensions of vector space may not represent distinct data elements, in which case elements of a vector representing a first element of user configuration data structure 200 may have numerical values that together represent a geometrical relationship to a vector representing a second element of user configuration data structure 200, wherein the geometrical relationship represents and/or approximates a semantic relationship between the first element of user configuration data structure 200 and the second element of user configuration data structure 200. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below.

Any vectors as described herein may be scaled, such that each vector represents each attribute along an equivalent scale of values. In an embodiment associating signal processing parameters 204 and/or comparator parameters 208 to one another as described above may include computing a degree of vector similarity between a vector representing each element of user configuration data structure 200 and a vector representing another element of user configuration data structure 200; vector similarity may be measured according to any norm for proximity and/or similarity of two vectors, including without limitation cosine similarity. As used in this disclosure "cosine similarity" is a measure of similarity between two-non-zero vectors of a vector space, wherein determining the similarity includes determining the cosine of the angle between the two vectors. Cosine similarity may be computed as a function of using a dot product of the two vectors divided by the lengths of the two vectors, or the dot product of two normalized vectors. For instance, and without limitation, a cosine of 0° is 1, wherein it is less than 1 for any angle in the interval $(0,\pi)$ radians. Cosine similarity may be a judgment of orientation and not magnitude, wherein two vectors with the same orientation have a cosine similarity of 1, two vectors oriented at 90° relative to each other have a similarity of 0, and two vectors diametrically opposed have a similarity of −1, independent of their magnitude. As a non-limiting example, vectors may be considered similar if parallel to one another. As a further non-limiting example, vectors may be considered dissimilar if orthogonal to one another. As a further non-limiting example, vectors may be considered uncorrelated if opposite to one another. Additionally, or alternatively, degree of similarity may include any other geometric measure of distance between vectors.

With continued reference to FIG. 2, as used in this disclosure "matrix" is a rectangular array or table of numbers, symbols, expressions, vectors, and/or representations arranged in rows and columns. For instance, and without limitation, matrix may include rows and/or columns comprised of vectors representing signal processing parameters 204 and/or comparator parameters 208, where each row and/or column is a vector representing a distinct set of parameters; set of parameters represented by vectors in matrix may include all signal processing parameters 204 and/or comparator parameters 208 as described above, including without limitation signal processing parameters 204 as described above.

With continued reference to FIG. 2, user configuration data structure 200 may include one or more matrices. A matrix may be generated by performing a singular value decomposition function. As used in this disclosure a "singular value decomposition function" is a factorization of a real and/or complex matrix that generalizes the eigen decomposition of a square normal matrix to any matrix of m rows and n columns via an extension of the polar decomposition. For example, and without limitation singular value decomposition function may decompose a first matrix, A, comprised of m rows and n columns to three other matrices, U, S, T, wherein matrix U, represents left singular vectors consisting of an orthogonal matrix of m rows and m columns, matrix S represents a singular value diagonal matrix of m rows and n columns, and matrix $V^T$ represents right singular vectors consisting of an orthogonal matrix of n rows and n columns according to the function:

$$A_{mxn} = U_{mxm} S_{mxn} V_{nxn}^T$$

singular value decomposition function may find eigenvalues and eigenvectors of $AA^T$ and $A^TA$. The eigenvectors of $A^TA$ may include the columns of $V^T$, wherein the eigenvectors of $AA^T$ may include the columns of U. The singular values in S may be determined as a function of the square roots of eigenvalues $AA^T$ or $A^TA$, wherein the singular values are the diagonal entries of the S matrix and are arranged in descending order. Singular value decomposition may be performed such that a generalized inverse of a non-full rank matrix may be generated.

With continued reference to FIG. 2, in some embodiments, receiving user configuration data structure 200 may include generating user configuration data structure 200. User configuration data structure 200 may be generated from one or more user inputs, such as user inputs received through a user interface 136 and/or from a remote device 132. For example user inputs may be received through user interfaces 136, as described further with respect to FIGS. 12-14.

With continued reference to FIG. 2, user configuration data structure 200 may include one or more signal processing parameters 204. For the purposes of this disclosure, "signal processing parameters" are parameters that are used to configure a signal processing module. In some embodiments, user configuration data structure 200 may include one or more comparator parameters 208. For the purposes of this disclosure, "comparator parameters" are parameters that are used to configure a comparator module.

With continued reference to FIG. 2, in some embodiments memory 108 may contain instructions 112 configuring at least a processor 104 to configure a signal processing module 212 as a function of one or more signal processing parameters 204 of user configuration data structure. A "signal processing module," for the purposes of this disclosure is a module that is configured to apply one or more signal processing filters or transformations to an input signal.

With continued reference to FIG. 2, signal processing parameters 204 may configure signal processing module to select one or more sub-modules of signal processing modules 212. For example signal processing parameters 204 may indicate a subset of sub-modules that should be used to process a given input signal 120. For example signal processing parameters 204 may indicate a particular order in which sub-modules should be applied to input signal 120. As non-limiting examples, sub-modules may include a momentum processing module 144, an autoregressive signal processing module 152, a smoothing processing module 216, and/or a linear predictor module 220. Momentum processing module 144 and autoregressive signal processing module 152 are further described with respect to FIG. 2. Signal processing module 212 may include any signal processing modules described throughout this disclosure. For the purposes of this disclosure, a "smoothing processing module" is a signal processing module that is configured to apply a smoothing filter to an input signal. In some embodiments, a smoothing processing module may be configured to apply a moving average filter to an input signal. For the purposes of this disclosure, a "linear predictor module," is a signal processing module that is configured to perform a linear extrapolation for a given input signal.

With continued reference to FIG. 2, smoothing processing module 216 may be configured to apply moving average filter to an input signal. For the purposes of this disclosure, a "moving average" is a statistical measure of time series data that is calculated by taking the average of a particular number of consecutive data points. In some embodiments, the number of consecutive data points that are taken into account for a moving average may be determined by a temporal coefficient. As a non-limiting example, if the temporal coefficient is two months, the consecutive data points that are taken into account for the moving average may be the data points for the last few months.

With continued reference to FIG. 2, moving average may include a cumulative moving average (CMA). A CMA takes into account all previous data points up to the current time. It may be calculated by summing all data points in the series and dividing by the number of periods considered. As more data points are added, the CMA may adjust to reflect the entire dataset up to that point, thus it gives an overall average up to the current time.

With continued reference to FIG. 2, moving average may include a simple moving average (SMA). An SMA is the most straightforward form of a moving average. It may be calculated by taking the arithmetic mean of a specified number of data points in a time series. For instance, to calculate a 5-day SMA, one may sum the prices of the last five days and then divide by five. The SMA may be recalculated as new data points become available, providing a constantly updated average.

With continued reference to FIG. 2, moving average may include an exponential moving average (EMA). An EMA may give more weight to recent data points, making it more responsive to recent changes in the data. This may be achieved by applying a smoothing factor (a value between 0 and 1), which determines the rate at which older data diminishes in importance. The EMA may be calculated by multiplying the most recent data point by the smoothing factor and adding it to the previous EMA, adjusted by the smoothing factor. The formula may involve a recursive component, making it different from the SMA.

With continued reference to FIG. 2, moving average may include a weighted moving average (WMA). A WMA may assign different weights to each data point in the time series, with more recent data typically given more importance. To calculate the WMA, one may multiply each data point by a predetermined weight and then sum these values. Finally, calculating the WMA may include dividing by the sum of the weights to get the weighted average. This method may allow for greater flexibility in emphasizing particular periods over others.

With continued reference to FIG. 2, linear predictor module 220 may perform linear extrapolation and/or prediction based on input signal 120. Linear predictor module 220 may perform a linear or curve fit on input signal 120 and use the linear or curve fit to extrapolate future data points. In some embodiments, linear predictor module 220 may include an autoregressive (AR) model. This model assumes that a value in a time series can be predicted as a linear combination of its previous values. The coefficients of the linear combination are determined through a process such as least squares fitting. The AR model may be calculated by minimizing the error between the predicted and actual values over a set of data, often using methods like the Yule-Walker equations or the Burg method. In some embodiments, linear predictor module 220 may include a moving average (MA) model. Unlike an AR model, which relies on past values of the series itself, an MA model uses past forecast errors to predict future values. In this model, the current value may be expressed as a linear combination of past error terms. The coefficients of the MA model are typically estimated using techniques like maximum likelihood estimation. In some embodiments, linear predictor module 220 may include an autoregressive moving average (ARMA) model. The ARMA model combines the AR and MA models, using both past values of the time series and past error terms to make predictions. It may be more flexible and accurate in modeling complex time series data. The parameters of an ARMA model may be estimated using methods such as maximum likelihood or least squares, and the model may be particularly useful when both autoregressive and moving average components are necessary to capture the characteristics of the data.

With continued reference to FIG. 2 configuring signal processing module 212 may include selecting one or more sub-modules of signal processing module 212 as a function of the one or more signal processing parameters 204. In some embodiments, selecting one or more sub-modules of the signal processing module 212 may include selecting momentum processing module 144 and autoregressive signal processing module 152. In some embodiments, selecting one or more sub-modules of signal processing module 212 may include selecting a first smoothing processing module 216 and a second smoothing processing module 216. As a non-limiting example, first and second smoothing processing module 216 may be configured to apply different types of moving average or smoothing filters. As a non-limiting example, first and second smoothing processing module 216 may be configured to apply different time periods (e.g., temporal coefficients) to the moving average. In some embodiments, selecting one or more sub-modules of signal processing module 212 may include selecting one or more sub-modules of the signal processing module 212 as a function of the one or more signal processing parameters 204 comprises selecting a linear predictor module 220.

With continued reference to FIG. 2, in some embodiments, configuring signal processing module 212 may include configuring a signal processing pipeline. A "signal processing pipeline," for the purposes of this disclosure, is a series of two or more signal processing modules (or sub-modules) that have been arranged in an order to determine a filtered signal. For example, signal processing pipeline may include a momentum processing module 144 followed by an autoregressive signal processing module 152. For example, signal processing pipeline may include applying a momentum processing module 144 followed by or in combination with a smoothing processing module 216.

With continued reference to FIG. 2, in some embodiments, configuring signal processing module 212 may include configuring a field programmable gate array (FPGA). FPGAs are integrated circuits that may be configured by a customer or designer after manufacturing, hence the term "field programmable." FPGAs might be used to implement custom hardware functionality and are composed of an array of programmable logic blocks and interconnects that can be configured to perform complex digital computations. These devices may offer flexibility, allowing for updates and adjustments to meet evolving requirements, which could make them suitable for applications where adaptability and rapid prototyping are important. FPGAs might be utilized in various industries, including automotive, telecommunications, and data centers, where specific, custom hardware solutions are often required.

With continued reference to FIG. 2, memory 108 may contain instructions 112 configuring at least a processor 104 to filter input signal 120 using the configured signal processing module 212 to generate a filtered signal 224. A "filtered signal," for the purposes of this disclosure, is a signal that has been processed using one or more signal filters. In some embodiments, generating filtered signal 224 may include sending input signal 120 through a signal processing pipeline as discussed above.

With continued reference to FIG. 2, filtering input signal 120 using configured signal processing module 212 to generate filtered signal 224 may include sequentially applying the momentum processing module and the autoregressive signal processing module to the input signal. This may be implemented as described with reference to FIG. 1, above.

With continued reference to FIG. 2, filtering input signal 120 using configured signal processing module 212 to generate filtered signal 224 may include applying the first smoothing processing module to the input signal, wherein the first smoothing processing module is configured to use a first temporal coefficient. In some embodiments, filtering input signal 120 using configured signal processing module 212 to generate filtered signal 224 may include applying the second smoothing processing module to the input signal, wherein the second smoothing processing module is configured to use a second temporal coefficient. In some embodiments, first smoothing processing module may be configured to apply a short-term moving average. For example, a short-term moving average may have a temporal coefficient of less than 50 days. For example, temporal coefficient for short-term moving average may be 5 days, 10 days, 15 days, 20 days, 25 days, 30 days, 35 days, 40 days, 45 days, and the like. In some embodiments, second smoothing processing module may be configured to apply a long-term moving average. For example, a long-term moving average may have a temporal coefficient of greater than or equal to 50 days. For example, temporal coefficient for long-term moving average may be 50 days, 75 days, 100 days, 150 days, 180 days, 1 year, 5 years, and the like.

With continued reference to FIG. 2, in some embodiments, user configuration data structure 200 may include selections of one or more indicators. For the purposes of this disclosure, an "indicator" is a predefined signal analysis method. As a non-limiting example, an indicator may include a price action indicator; in some embodiments, this may be referred to as ASTROTEND. For this indicator, input signal 120 may include a price action input. In some embodiments, signal processing module 212 may be configured to identify uptrends and/or downtrends in input signal 120. A linear predictor module 220 may be used to extrapolate the uptrends and downtrends to create trendlines. As a non-limiting example, comparator module 228, as discussed further bellow, may determine that ASTROTEND is positive if a future input signal is above the trendline. As a non-limiting example, comparator module 228, as discussed further below, may determine that ASTROTEND is negative if a future input signal is below the trendline.

With continued reference to FIG. 2, in some embodiments, indictors may include another indicator, which may be constructed by first applying a momentum processing module 144 to input signal 120, then applying an autoregressive signal processing module 152; in some embodiments, this may be referred to as DELTA-V. Calculation of this indicator is described in detail with respect to FIGS. 1 and 3-11. In some embodiments, Comparator Module 228 may be configured to make the bull/bear and/or positive/negative determination as described in detail with respect to FIGS. 1 and 3-11.

With continued reference to FIG. 2, in some embodiments, indicators may include another indicator, the status of which may be determined using temporal data; in some embodiments, this may be referred to as CALENDER EFFECTS. In some embodiments, signal processing module 212 may be configured to apply a temporal processing module to determine whether the indicator is in or out. In some embodiments, if the indicator is "in" it may be assigned a value of 1 for that time period and if the indicator is "out" it may be assigned a value of "0." Temporal processing module may act as a binary filter. As a function of temporal data, this indicator may be "in" four days before the end of the month and may switch to "out" 3 days into the new month. This general rule may be subject to the following exceptions: For the July to August in-market period, indicator switches to "out" 2 days into August, skip the September to October "in" period, for the October to November "in" period, switch to "out" 4 days into November, for the November to December "in" period, switch to "in" on or before the last market day before Thanksgiving, and switch to "out" 4 days into December, for the December to January "in" period, switch to "in" 2-days before Christmas.

With continued reference to FIG. 2, in some embodiments, indicators may include another indicator, which may apply the Bull/Bear trend analysis (e.g., using a momentum processing module 144 and autoregressive signal processing module) and evaluate this across many signals (e.g., representing various ETFs); in some embodiments, this indicator may be called GALACTIC SHIELD. In some embodiments, comparator module 228 may determine this indicator to be "in" if the majority of ETFs representing U.S. domestic asset classes or international ETF's are determined to be "bull" at the end of a quarter. In some embodiments, comparator module 228 may determine this indicator to be "out" if both the majority of ETFs representing the U.S. and international markets are determined to be "bear." In some embodiments signals for each ETF may be received as input signals 120.

With continued reference to FIG. 2, in some embodiments, indicators may include another indicator, which may apply a standard deviation to input signal 120; in some embodiments, this indicator may be called STARFLUX. In some embodiments, signal processing module 212 may include a standard deviation module, which may determine a standard deviation of a price history of input signal 120. In some embodiments, a moving average filter may also be applied using smoothing processing module 216. In some embodiments, if the closing price is greater than the upper trend line+lower standard deviation bound, then the indicator is "in." In some embodiments, if the closing price is greater than the upper trend line+lower standard deviation bound, then the indicator is "out."

With continued reference to FIG. 2, in some embodiments, indicators may include another indicator that uses a moving average distance; in some embodiments, this indicator may be called STARPATH. In some embodiments, when this indicator is selected, signal processing module 212 may be configured to process input signal 120 using a first smoothing processing module 216 and a second smoothing processing module 216 in parallel. In some embodiments, first smoothing processing module 216 may apply a short-term moving average and second smoothing processing module 216 may apply a 200-day moving average. In some embodiments, a moving average distance may be determined by finding the difference between the short-term moving average and the 200-day moving average. The moving average distance may be determined for a plurality of market segments (e.g., plurality of input signals 120) and then these ratings are ranked and then compared to a cash-value of 1. When the number of market segments ranked superior to Cash increases, the StarPath indicator is positive, indicating a shift in the balance of strength towards positivity. Conversely, if the number of market segments ranked above Cash decreases, the StarPath indicator is negative, signifying a shift in the balance of strength towards negativity. If there is no change in the number of market segments ranked as superior to Cash on any given day, the StarPath indicator remains unchanged.

With continued reference to FIG. 2, memory 108 may contain instructions 112 configuring at last processor 104 to configure comparator module 228 as a function of one or more comparator parameters 208 of the user configuration data structure 200. In some embodiments, processor 104 may configure comparator module 228 to determine the status of the indicators described above (e.g., in/out, positive/negative). In some embodiments, comparator module 228 may apply boolean logic to one or more of the indicators and/or filtered signals 224. In some embodiments, comparator module 228 may evaluate the status of a plurality of filtered signal using one or more criteria. Boolean conditions may include AND, OR, NOT, and the like.

With continued reference to FIG. 2, memory 108 may contain instructions 112 configuring the at least a processor 104 to generate a comparator output as a function of the configured comparator module, wherein the comparator module is configured to apply a plurality of boolean conditions to the filtered signal. In some embodiments, this may be further described with reference to FIG. 12.

With continued reference to FIG. 2, memory 108 may contain instructions 112 configuring at least a processor to determine a corresponding selection as a function of user configuration data structure 200. For example, user configuration data structure 200 may configure comparator module 228 to make a selection if a criteria or true for filtered signal 224—for example, this may include applying boolean logic to evaluate the status of many conditions.

With continued reference to FIG. 2, memory 108 may contain instructions 112 configuring at least a processor 104 to generate a display data structure 164 using the filtered signal 224 and comparator output 232. In some embodiments, processor 104 may be configured to transmit the display data structure 164 to a remote device 132.

Figure 3:
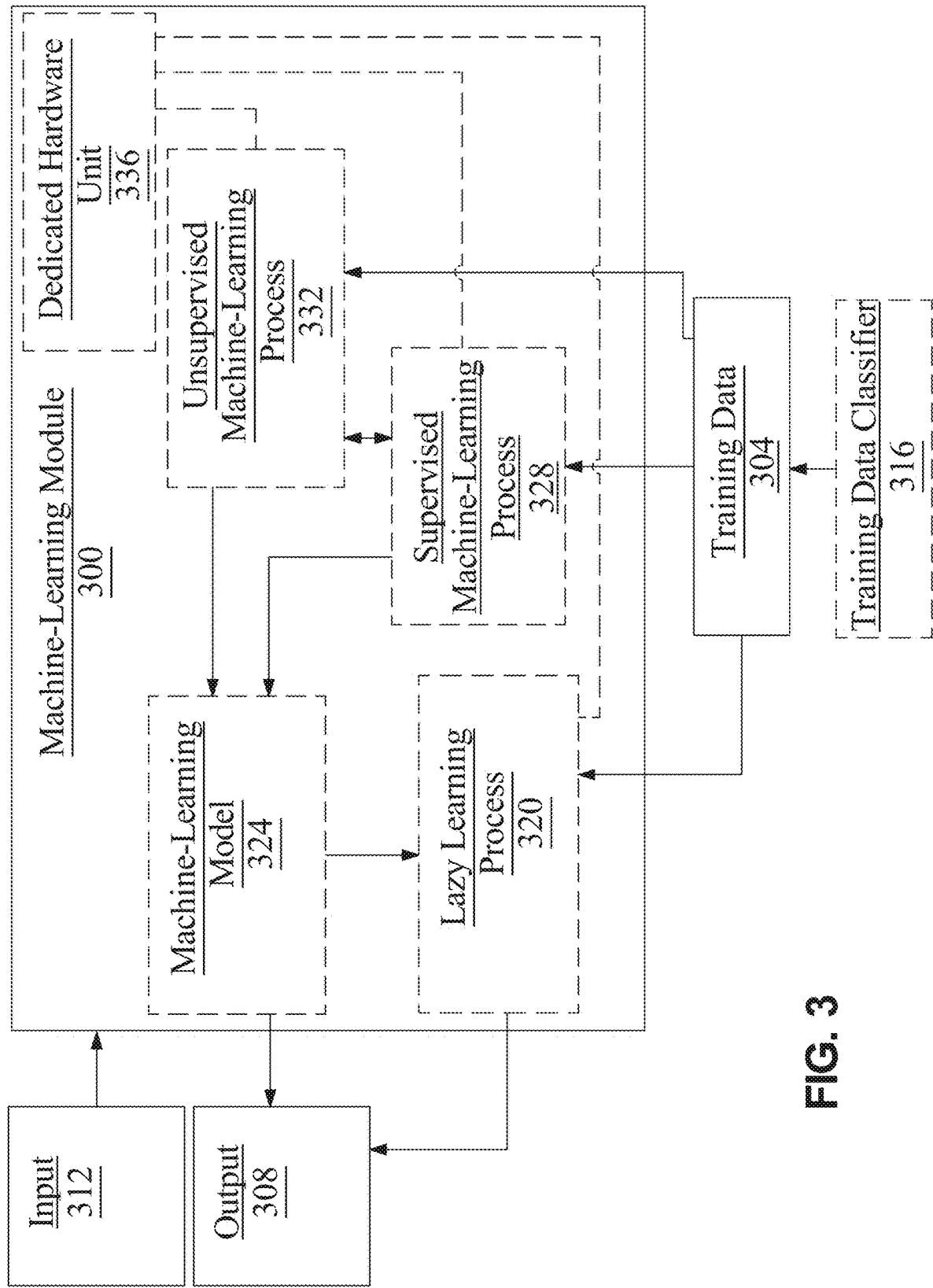
FIG. 3 is a box diagram of an exemplary machine learning model.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312 this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, time-series sequences 124 may be correlated with dynamic vectors 160.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to a particular industry, financial instrument type, time frame, entity size, and the like.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs down sampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been down sampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include time-series sequences 124 as described above as inputs, dynamic vectors 160 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

With continued reference to FIG. 3, apparatus 100 may use user feedback to train the machine-learning models and/or classifiers described above. For example, classifier may be trained using past inputs and outputs of classifier. In some embodiments, if user feedback indicates that an output of classifier was "bad," then that output and the corresponding input may be removed from training data used to train classifier, and/or may be replaced with a value entered by, e.g., another user that represents an ideal output given the input the classifier originally received, permitting use in retraining, and adding to training data; in either case, classifier may be retrained with modified training data as described in further detail below. In some embodiments, training data of classifier may include user feedback.

With continued reference to FIG. 3, in some embodiments, an accuracy score may be calculated for classifier using user feedback. For the purposes of this disclosure, "accuracy score," is a numerical value concerning the accuracy of a machine-learning model. For example, a plurality of user feedback scores may be averaged to determine an accuracy score. In some embodiments, a cohort accuracy score may be determined for particular cohorts of persons. For example, user feedback for users belonging to a particular cohort of persons may be averaged together to determine the cohort accuracy score for that particular cohort of persons and used as described above. Accuracy score or another score as described above may indicate a degree of retraining needed for a machine-learning model such as a classifier; apparatus 100 may perform a larger number of retraining cycles for a higher number (or lower number, depending on a numerical interpretation used), and/or may collect more training data for such retraining, perform more training cycles, apply a more stringent convergence test such as a test requiring a lower mean squared error, and/or indicate to a user and/or operator that additional training data is needed.

Figure 4:
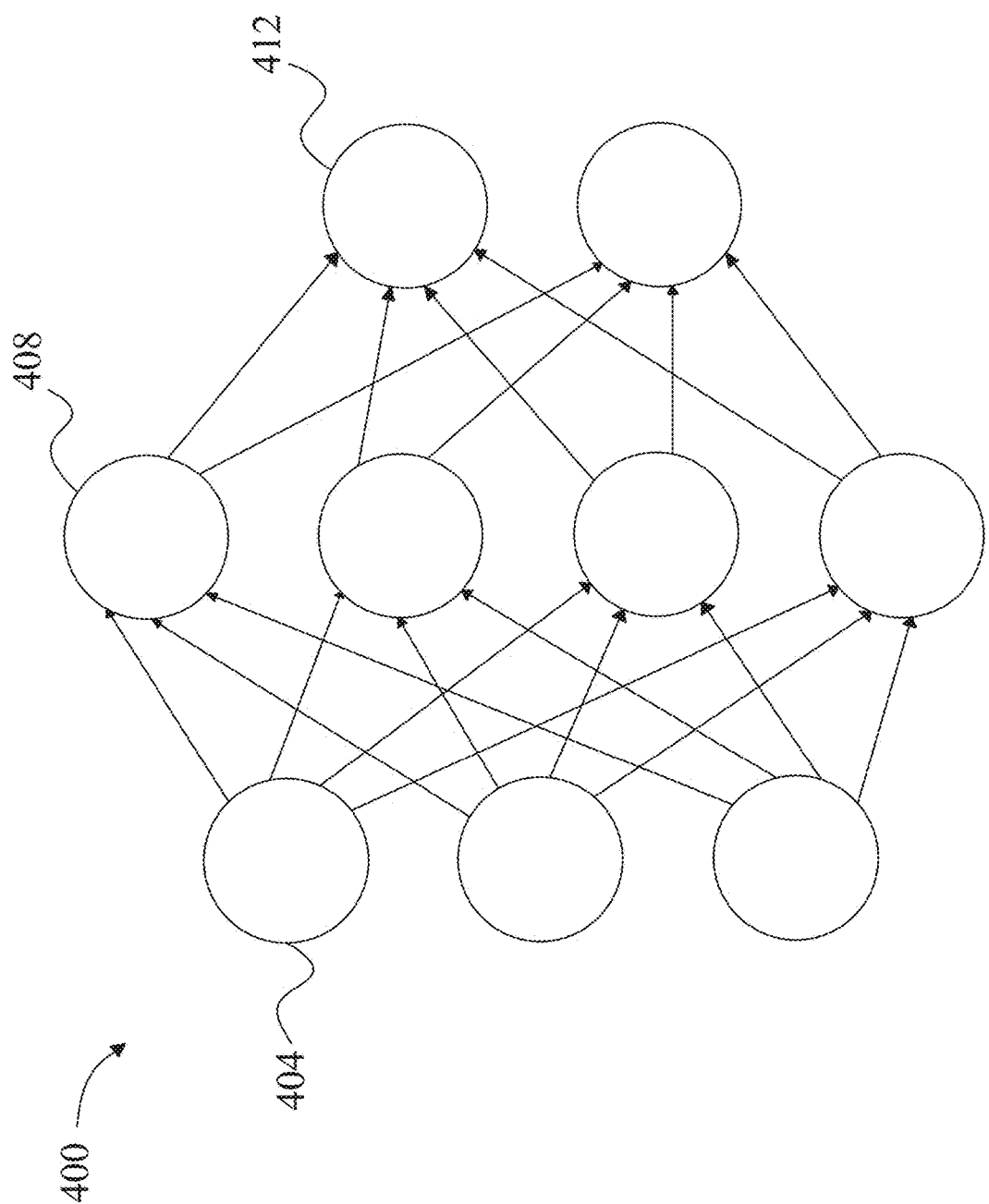
FIG. 4 is a diagram of an exemplary neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
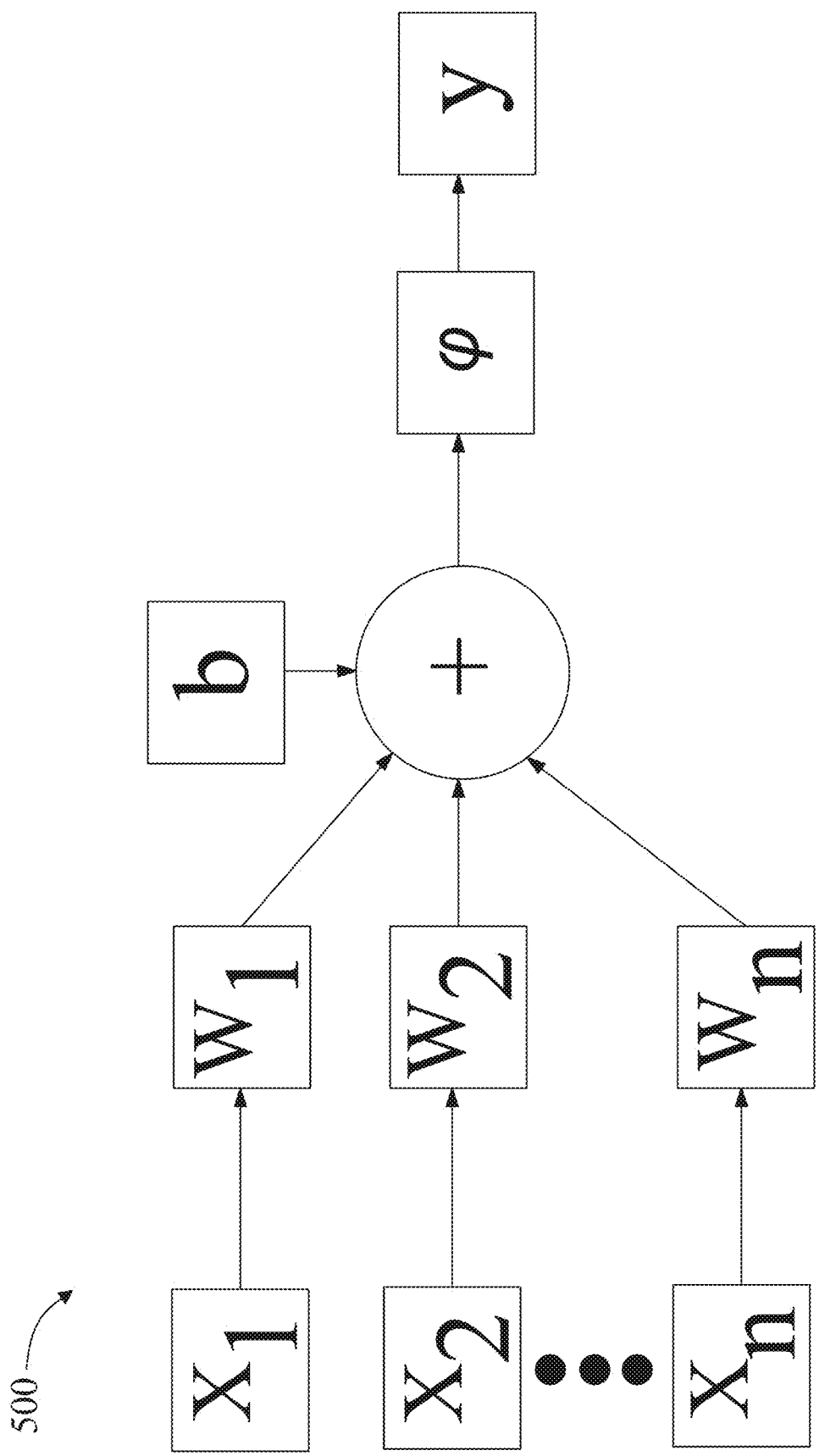
FIG. 5 is a diagram of an exemplary neural network node.

Referring now to FIG. 5, an exemplary embodiment of a node 500 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $f(x)=1/1-e^{-x}$ given input x, a tanh (hyperbolic tangent) function, of the form $e^x-e^{-x}/e^x+e^{-x}$, a tanh derivative function such as $f(x)=\tanh^2(x)$, a rectified linear unit function such as $f(x)=\max(0,x)$, a "leaky" and/or "parametric" rectified linear unit function such as $f(x)=\max(ax,x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $f(x_i)=e^x/\Sigma_i x_i$ where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or an "inhibitory," indicating it has a weak effect influence on the one more inputs y, for instance by the corresponding weight having a small numerical value. The values of weights $w_i$ may be determined by training a neural network using training data, which may be performed using any suitable process as described above.

Still referring to FIG. 5, a "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like. CNN may include, without limitation, a deep neural network (DNN) extension, where a DNN is defined as a neural network with two or more hidden layers.

Still referring to FIG. 5, in some embodiments, a convolutional neural network may learn from images. In non-limiting examples, a convolutional neural network may perform tasks such as classifying images, detecting objects depicted in an image, segmenting an image, and/or processing an image. In some embodiments, a convolutional neural network may operate such that each node in an input layer is only connected to a region of nodes in a hidden layer. In some embodiments, the regions in aggregate may create a feature map from an input layer to the hidden layer. In some embodiments, a convolutional neural network may include a layer in which the weights and biases for all nodes are the same. In some embodiments, this may allow a convolutional neural network to detect a feature, such as an edge, across different locations in an image.

Figure 6:
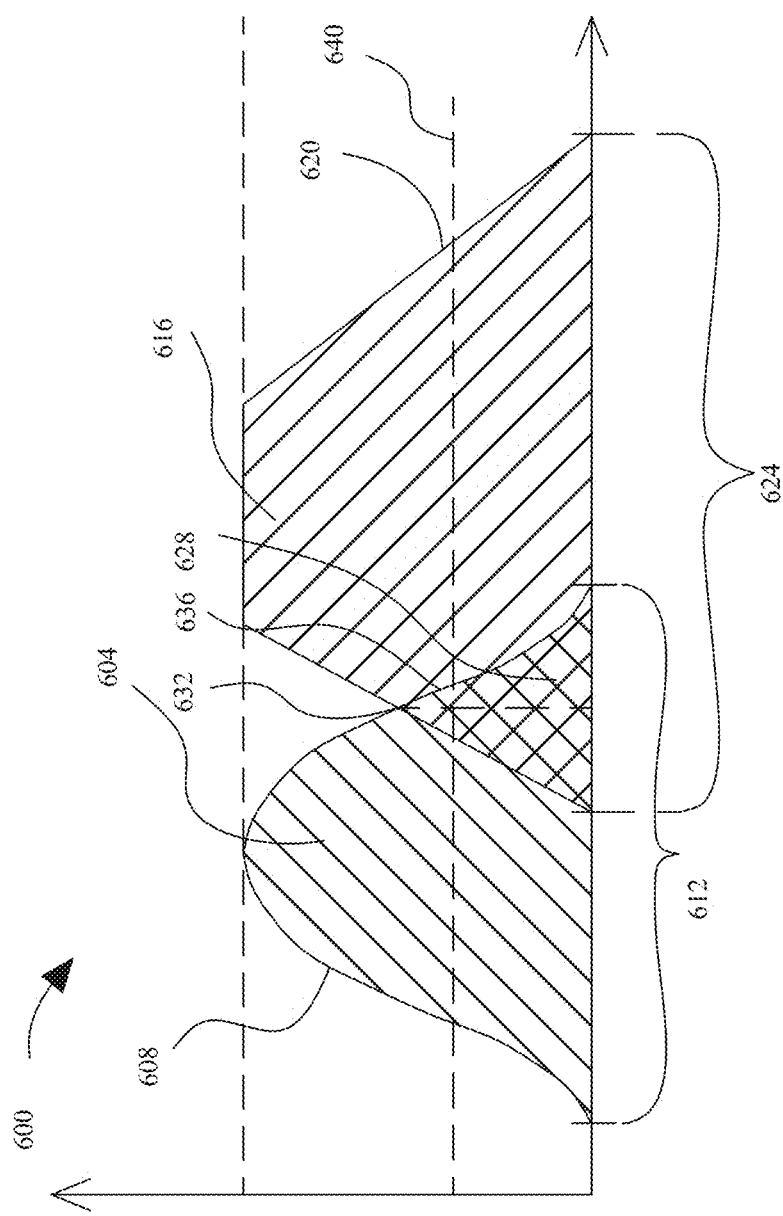
FIG. 6 is a diagram of an exemplary fuzzy inferencing system.

Referring to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \dfrac{x-a}{b-a}, \text{ for } a \leq x < b \\ \dfrac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x,a,c) = 1/1 - e^{-a(x-c)}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models, dynamic vector 160, and a predetermined class, such as without limitation of dynamic vector 160. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models and/or dynamic vector 160 and a predetermined class, such as without limitation dynamic vector 160 categorization, for combination to occur as described above. Alternatively, or additionally, each threshold may be tuned by a machine-learning and/or statistical process, for instance and without limitation as described in further detail below.

Further referring to FIG. 6, in an embodiment, a degree of match between fuzzy sets may be used to classify a dynamic vector 160 with dynamic vector 160. For instance, if a dynamic vector 160 has a fuzzy set matching dynamic vector 160 fuzzy set by having a degree of overlap exceeding a threshold, processor 104 may classify the dynamic vector 160 as belonging to the dynamic vector 160 categorization. Where multiple fuzzy matches are performed, degrees of match for each respective fuzzy set may be computed and aggregated through, for instance, addition, averaging, or the like, to determine an overall degree of match.

Still referring to FIG. 6, in an embodiment, a dynamic vector 160 may be compared to multiple dynamic vector 160 categorization fuzzy sets. For instance, dynamic vector 160 may be represented by a fuzzy set that is compared to each of the multiple dynamic vector 160 categorization fuzzy sets; and a degree of overlap exceeding a threshold between the dynamic vector 160 fuzzy set and any of the multiple dynamic vector 160 categorization fuzzy sets may cause processor 104 to classify the dynamic vector 160 as belonging to dynamic vector 160 categorization. For instance, in one embodiment there may be two dynamic vector 160 categorization fuzzy sets, representing respectively dynamic vector 160 categorization and a dynamic vector 160 categorization. First dynamic vector 160 categorization may have a first fuzzy set; Second dynamic vector 160 categorization may have a second fuzzy set; and dynamic vector 160 may have a dynamic vector 160 fuzzy set, processor 104, for example, may compare a dynamic vector 160 fuzzy set with each of dynamic vector 160 categorization fuzzy set and in dynamic vector 160 categorization fuzzy set, as described above, and classify a dynamic vector 160 to either, both, or neither of dynamic vector 160 categorization or in dynamic vector 160 categorization. Machine-learning methods as described throughout may, in a non-limiting example, generate coefficients used in fuzzy set equations as described above, such as without limitation x, c, and σ of a Gaussian set as described above, as outputs of machine-learning methods. Likewise, dynamic vector 160 may be used indirectly to determine a fuzzy set, as dynamic vector 160 fuzzy set may be derived from outputs of one or more machine-learning models that take the dynamic vector 160 directly or indirectly as inputs.

Figure 7:
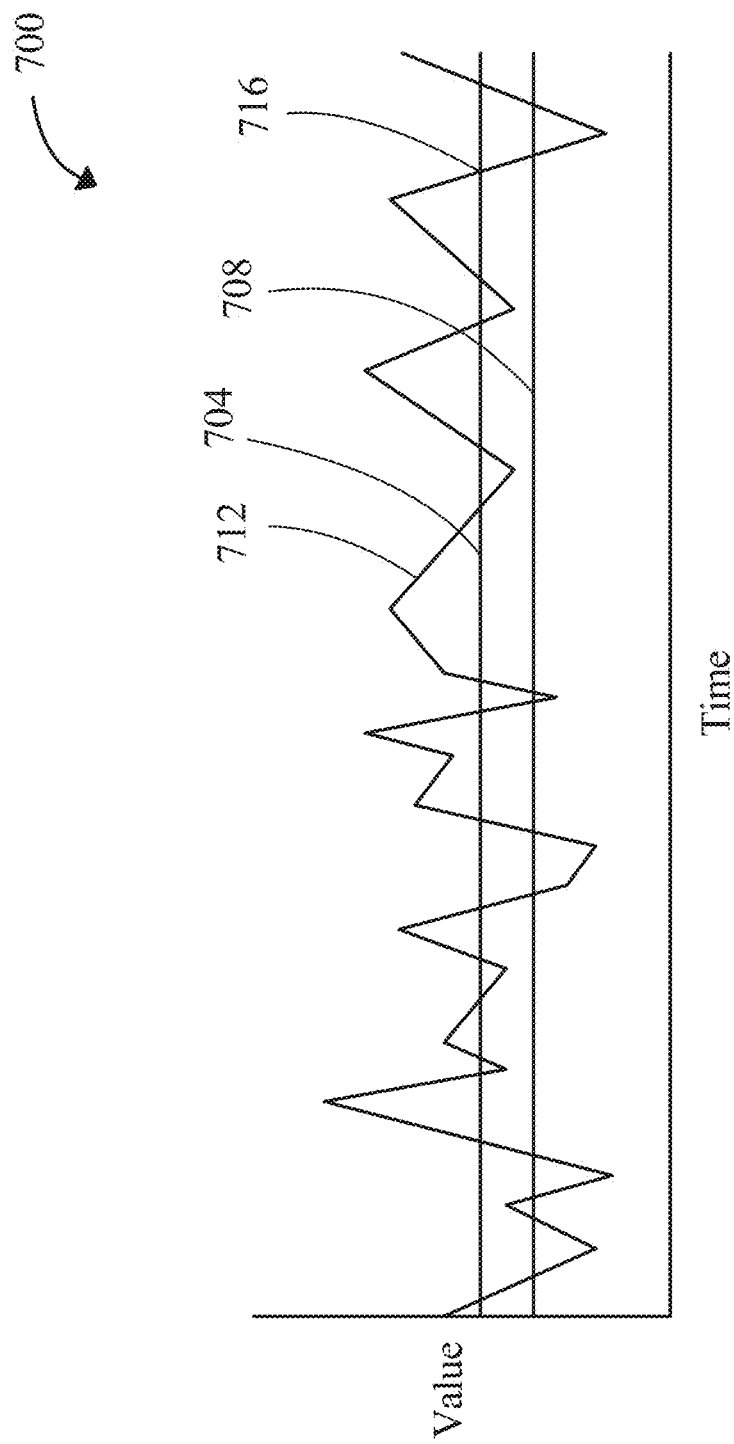
FIG. 7 is a chart depicting directional momentum signals.

Referring now to FIG. 7, an exemplary graph 700 depicting a relationship between directional momentum signals and dynamic boundary values is provided. In some embodiments, graph 700 may be a display element, as described further with respect to FIG. 1. In some embodiments, an upper threshold value 704 and a lower threshold boundary value 708 may be determined. These may be determined as described with reference to FIG. 1. Directional momentum signal 712 may be determined as described with reference to FIG. 1. For example, directional momentum signal 712 may be determined by taking a derivative of a time-series sequence. As shown in FIG. 7, directional momentum signals may be determined for a plurality of time points, for example, in order to create a continuous graph. At locations where directional momentum signal is equal to a threshold value, a value of a dynamic vector calculation may change. For example, at point 716, a dynamic vector calculation may go from positive to neutral.

Figure 8:
FIG. 8 is a diagram depicting an exemplary display element.

Referring now to FIG. 8, an exemplary display element 800 is depicted. In some embodiments, a display element may include a view that identifies one or more time frames, and dynamic vectors (PDAV) and/or dynamic vector changes taking place in those time frames. In some embodiments, a display element may include a view that identifies a number of positive dynamic vectors, along with associated dynamic vectors, total days, percent total days, annualized return of an index, and maximum drawdown. In some embodiments, exemplary display element 800 may include one or more temporal elements 808.

With continued reference to FIG. 8, a color event handler, as described above, may operate on one or more of the cells of display element 800 to determine the color of cells. As a non-limiting example, color event handler may be configured to determine the color of "PDAV" cells. For example, "negative" may be mapped to red, "neutral" to yellow, and "positive" to green. As a non-limiting example, color event handler may be configured to determine the color of "dynamic vector" cells.

Figure 9:
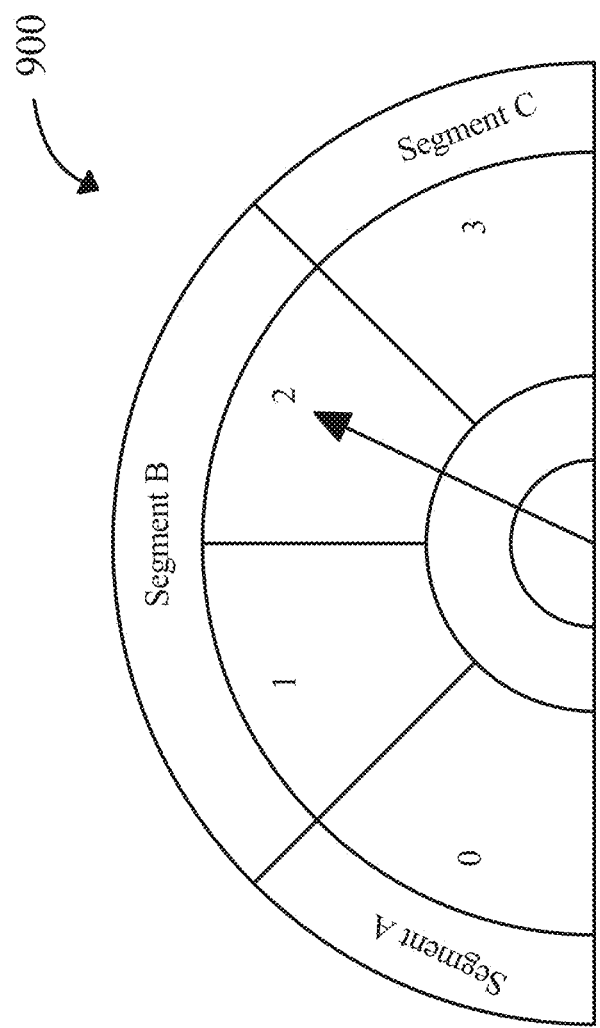
FIG. 9 is a diagram depicting an exemplary display element.

Referring now to FIG. 9, an exemplary gauge display element 900 is depicted. In some embodiments, a display element may include a dial that indicates a state or value of dynamic vector 160. In a non-limiting example, dynamic vector 160 may be calculated by subtracting the number of negative dynamic vectors 160 from the number of positive dynamic vectors 160 from a set of dynamic vectors 160. For example, as shown in FIG. 9, this operation may have a value of 2, and dynamic vector 160 may include a categorization such as a categorization into segment A, segment B, or segment C as in FIG. 9.

Still referring to FIG. 9, in some embodiments, a dial may include one or more color coded regions, such as color coded regions indicating when dynamic vector 160 is in a positive, neutral, or negative state. In some embodiments, color of color coded regions may be determined using a color event handler as described above. In some embodiments, a dial may include an arrow pointing to a region, where a region indicated by an arrow indicates a state of dynamic vector 160. In some embodiments, a dial may include one or more visual effects, including lighting effects, shadows, particle effects, and the like in order to highlight a state of dynamic vector 160. For example, a shadow may be used to draw the eyes away from non-highlighted regions, and a particle effect may be displayed around a highlighted region. In some embodiments, a dial may include one or more animated components. For example, an arrow indicating a state of dynamic vector 160 may move to a different segment of a dial when dynamic vector 160 changes (such as based on new data). In some embodiments, a dial may be displayed alongside one or more interactive components. For example, buttons for refreshing the visual element based on the latest data, and/or displaying a more detailed breakdown of relevant information may be displayed. As another example, a button for accessing a page describing a financial instrument and/or allowing a user to purchase a financial instrument may be displayed alongside a dial associated with the financial instrument. In some embodiments, a plurality of dials may be displayed. For example, dials representing data relevant to each entity in an industry, each entity on an index, or the like may be displayed alongside each other. In some embodiments, dials may be selected and displayed based on dynamic vector 160 or other metrics described herein. For example, dials may be selected based on particularly high or low performing dynamic vectors 160. In some embodiments, dials may be selected and displayed based on attributes of an associated entity, such as a market cap of an associated entity. In some embodiments, dials representing multiple entities may be displayed. For example, a first dial representing a stock of a particular entity may be displayed alongside a second dial representing a market and/or a third dial representing an industry. In some embodiments, dials may move such that they are rearranged, for example, when new data is obtained and new values for variables described herein are calculated.

Figure 10:
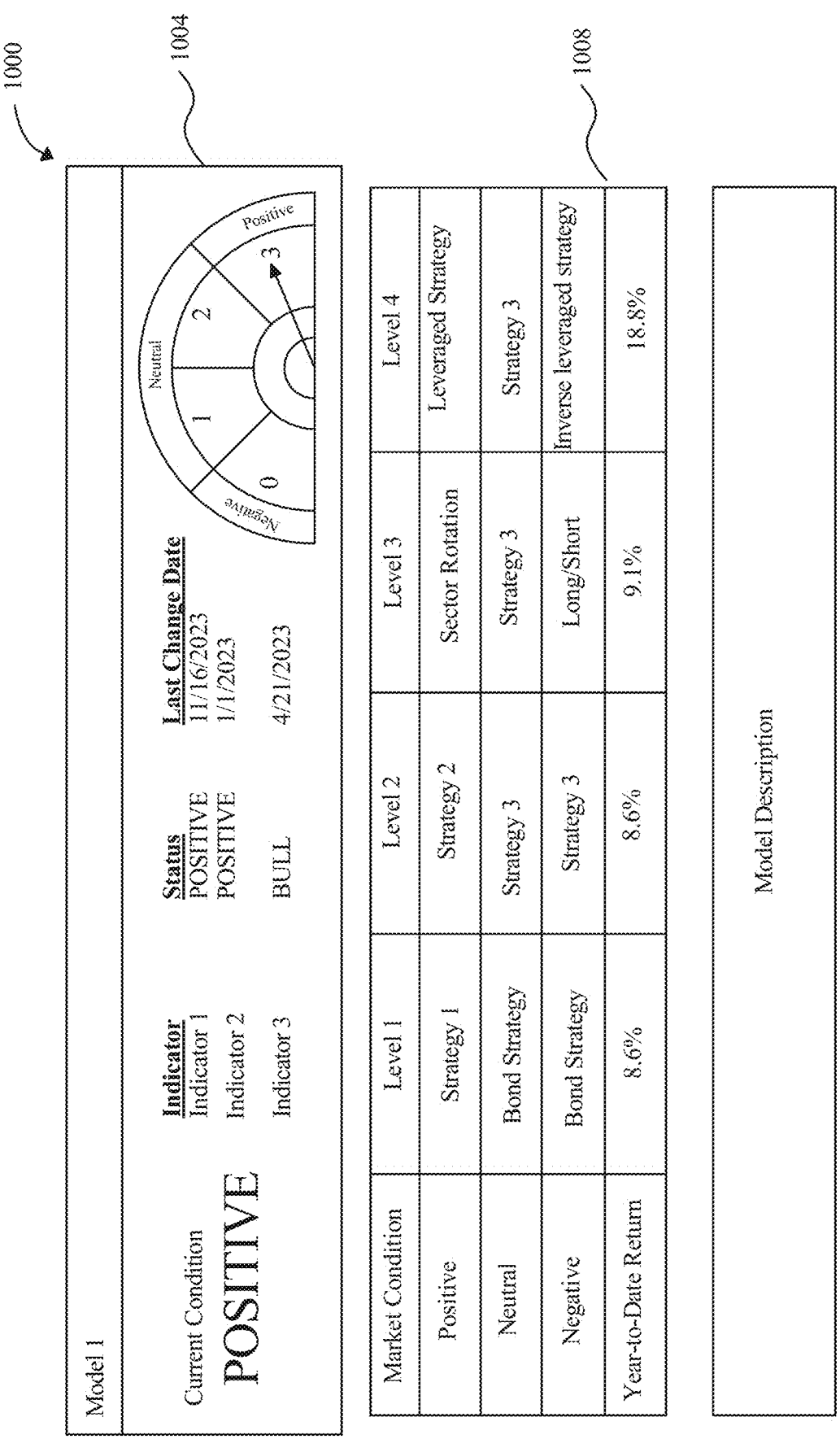
FIG. 10 is a diagram depicting an exemplary display data structure.

Referring now to FIG. 10, an exemplary display data structure 1000 is illustrated. As a non-limiting example, display data structure 1000 may be configured for displaying market conditions and corresponding investment models (e.g., harmony model) or strategies based on system analysis. In one or more embodiment, display data structure 1000 may be structured to dynamically present a plurality of display elements representing the current market sentiment, investment recommendations, and key indicators as described above with reference to FIGS. 1 and 6-8. In some cases, display data structure 1000 may include a dynamic vector representation using a gauge display element 1004 including a scale ranging from "NEGATIVE" to "POSITIVE" with one or more intermediate states such as "NEUTRAL." Gauge display element 1004 may be configured as a visual cue for users to quickly grasp the overall market sentiment. Additionally, or alternatively, display data structure 1000 may include a display element 1008 outlining specific investment recommendations, categorized by different risk levels (e.g., level 1 to level 4) and market conditions, associated with at least one time-series sequence classification model (i.e., investment model) such as, without limitation, a Harmony model. As a non-limiting example, for the "POSITIVE" market condition, investment strategies may include "buy/replace," "buy/replace," "1.5× Lev. Sector Rotation," and "2× Leveraged S&P 500 Mut Fd ULPIX, ETF SSO," for level 1 to level 4 respectively. Further, display element 1008 may include one or more performance metrics; for instance, and without limitation, display element 1008 may include a "Year-to-Date Return" for each risk level e.g., "Level 1:8.6%, Level 2:8. 6%, Level 3:9.1%, Level 4:18.8%." In some cases, a brief description of the model used, for example, details on how model constructs user's portfolio, may be also included.

Figure 11:
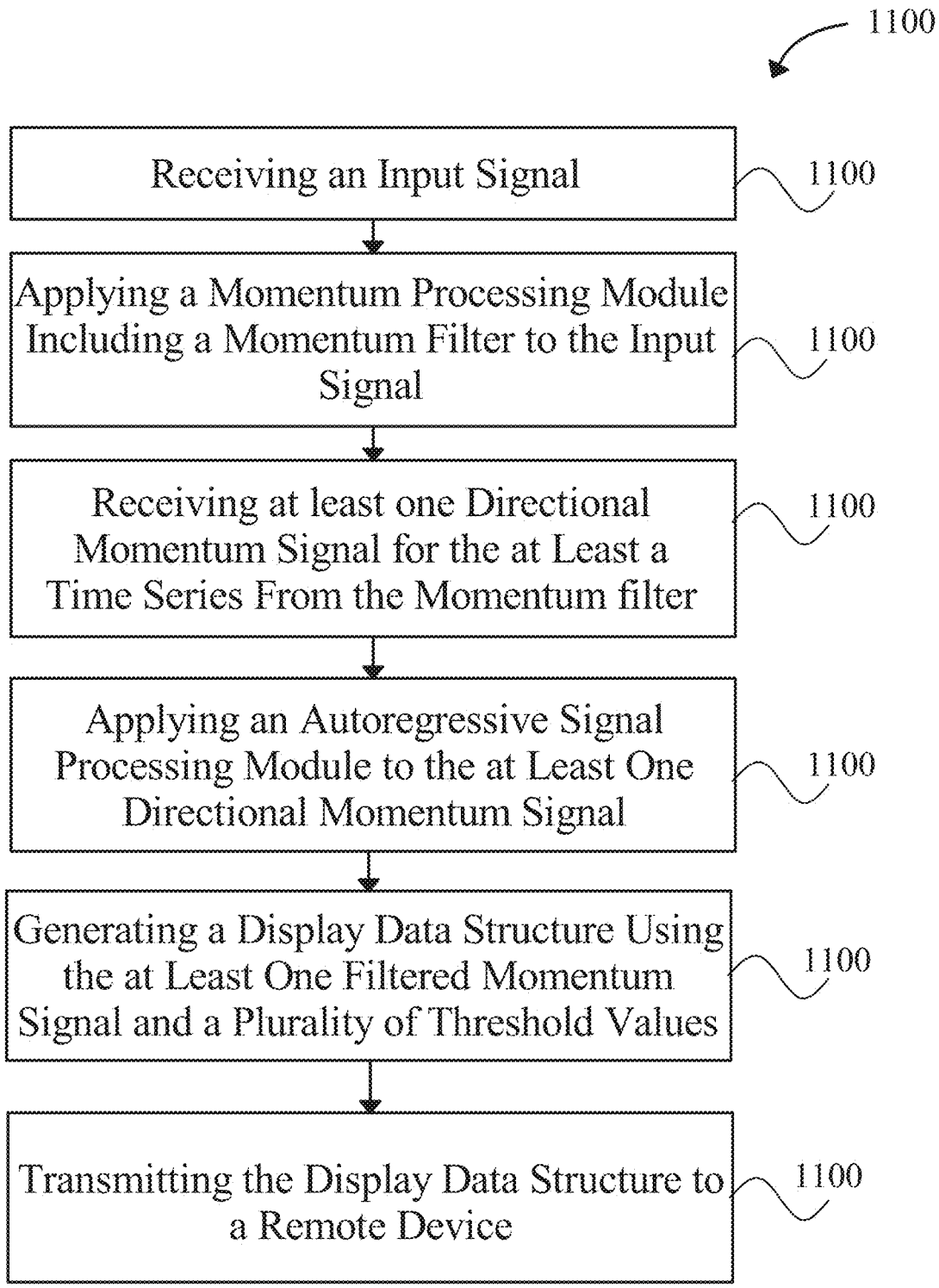
FIG. 11 is a diagram depicting an exemplary method of generating a generating a display data structure from an input signal.

Referring now to FIG. 11, a method 1100 of generating a display data structure from an input signal is shown. Method 1100 includes a step 1105 of receiving, by at least a processor, an input signal, wherein the input signal includes at least a time-series sequence. This may be conducted as disclosed with reference to FIGS. 1-9 above.

With continued reference to FIG. 11, method 1100 includes a step 1110 of applying, by the at least a processor, a momentum processing module to the input signal. This may be conducted as disclosed with reference to FIGS. 1-16.

With continued reference to FIG. 11, method 1100 includes a step 1115 of receiving, by the at least a processor, at least one directional momentum signal for the at least a time series from the momentum filter. This may be conducted as disclosed with reference to FIGS. 1-16.

With continued reference to FIG. 11, method 1100 includes a step 1120 of applying, by the at least a processor, an autoregressive signal processing module to the at least one directional momentum signal. Applying the autoregressive signal processing module includes receiving the at least one directional momentum signal and a temporal coefficient. Applying the autoregressive signal processing module includes determining at least one filtered momentum signal as a function of the at least one directional momentum signal and the temporal coefficient. In some embodiments, autoregressive signal processing module includes an autoregressive filter wherein the auto regressive filter comprises three filter taps. In some embodiments, applying the autoregressive signal processing module to the at least one directional momentum signal includes receiving a second temporal coefficient, wherein the second temporal coefficient is longer than the first temporal coefficient and determining a second filtered momentum signal as a function of the at least one directional momentum signal and the second temporal coefficient. This may be conducted as disclosed with reference to FIGS. 1-16.

With continued reference to FIG. 11, method 1100 includes a step 1025 of generating, by the at least a processor, a display data structure using the at least one filtered momentum signal and a plurality of threshold values. Generating the display data structure includes forming a dynamic vector using the at least one filtered momentum signal and a plurality of threshold values. In some embodiments, generating the display data structure includes applying a continuous mask to the dynamic vector, wherein the continuous mask is configured to make the dynamic vector to a set of continuous values. In some embodiments, forming the dynamic vector comprises determining a dynamic vector for each time-series sequence associated with a particular category, wherein each time-series sequence of the plurality of time-series sequences is associated with a category. In some embodiments, the display data structure includes a gauge display element, wherein the gauge display element comprises a gauge reading element located at a gauge reading element orientation, wherein the gauge reading element orientation is determined as a function of the dynamic vector. In some embodiments, the gauge display element is configured to display a set of continuous values using the gauge reading element. In some embodiments, display data structure may include a temporal element, wherein the temporal element is a function of a change in the dynamic vector. In some embodiments, the display data structure may include a graphical element, wherein the graphical element includes the at least one filtered momentum signal and the plurality of threshold values. In some embodiments, the display data structure is further configured to cause the remote device to display the graphical element, wherein displaying the graphical element comprises overlaying the plurality of threshold values on top of the at least one filtered momentum signal. This may be conducted as disclosed with reference to FIGS. 1-16. In some embodiments, method 1100 may include applying a continuous mask to the dynamic vector, wherein the continuous mask is configured to make the dynamic vector to a set of continuous values. This may be conducted as disclosed with reference to FIGS. 1-16.

With continued reference to FIG. 11, method 1100 includes a step 1030 of transmitting, by the at least a processor, the display data structure to a remote device, wherein the display data structure is configured to cause the remote device to display the dynamic vector. This may be conducted as disclosed with reference to FIGS. 1-16.

Figure 12:
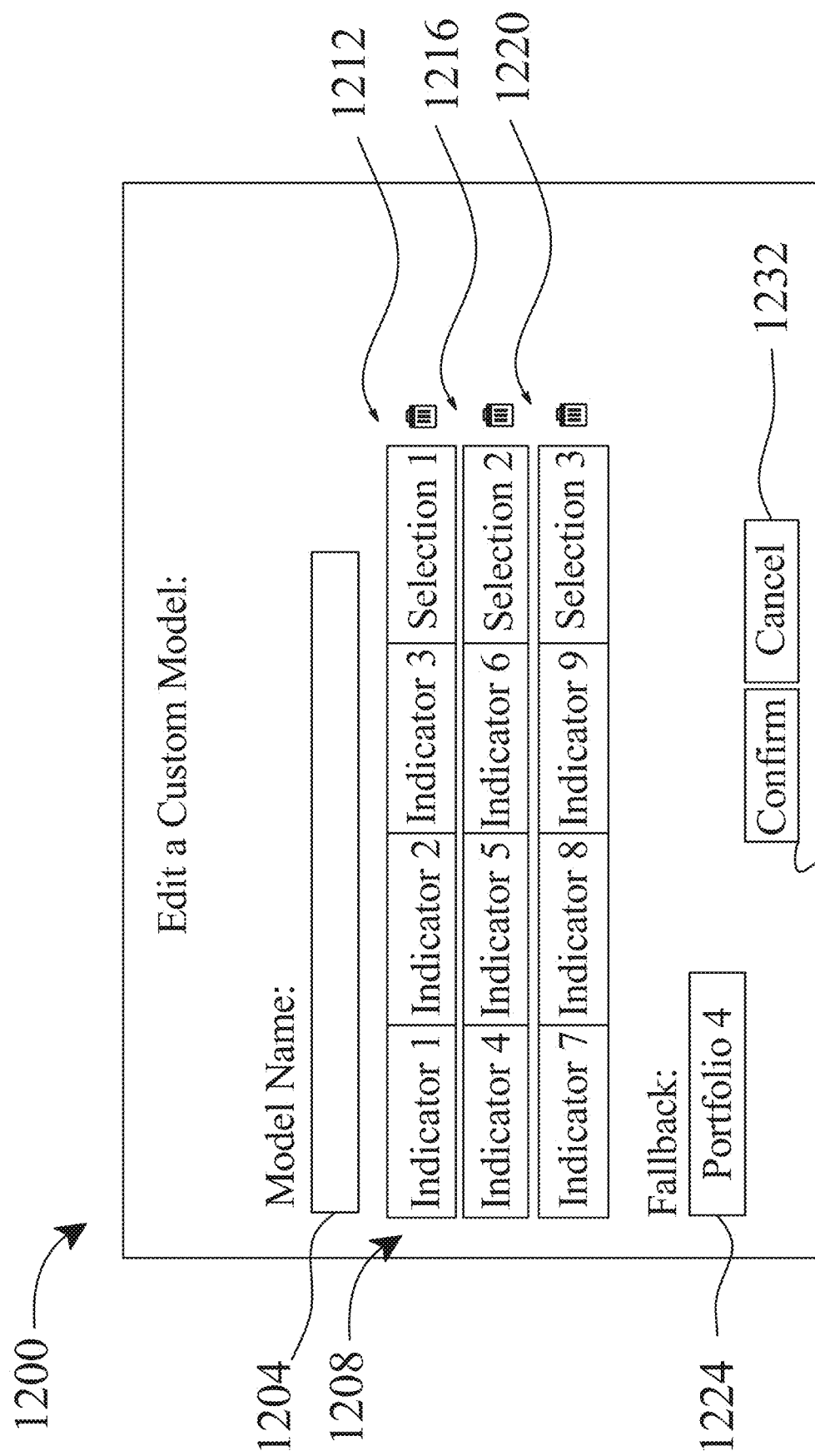
FIG. 12 is a diagram of an exemplary user configuration interface.

Referring now to FIG. 12, an exemplary embodiment of a user configuration interface 1200. In some embodiments, interface 1200 may include a model name entry field 1204. Model name entry field 1204 may include a text entry field, where users may freely input text information. In some embodiments, model name entry field 1204 may allow users to assign names to particular user configuration data structures 200. In some embodiments, processor 104 may be configured to receive a user configuration data structure, and generate user configuration interface 1200 as a function of the user configuration data structure. In some embodiments, processor 104 may be configured to receive from a user interface, the user configuration data structure.

With continued reference to FIG. 12, in some embodiments, processor 104 may be configured to generate user configuration display data structure, wherein the user configuration display data structure comprises an array of user input elements 1208. User input elements 1208 may define a plurality of boolean conditions. In some embodiments, each user input element 1208 of the array of user input elements 1208, may include a dropdown menu. A "dropdown menu," for the purposes of this disclosure, is a user interface, which expands to present a user with a plurality of selections when it is selected. In some embodiments, each of the plurality of dropdown menus may be configured to allow a user to select an indicator of a plurality of indicators. For example, any of the indicators mentioned throughout this disclosure may be presented in a dropdown menu for selection.

With continued reference to FIG. 12, in some embodiments, array of user input elements 1208 may include at least one row of user input elements. In some embodiments, at least one row of user input elements may include a first row 1212, second row 1216, and/or third row 1220. In some embodiments, comparator module 228, as discussed with reference to FIG. 2, may be configured to evaluate the status of each row of user input elements. For example, for a row of user input elements, for a row to be "true," each user input element (e.g., indicator 1, indicator 2, indicator 3) must be "in" (i.e. positive). For example each user input element in a row may be connected using "AND" boolean logic, such that each user input element must be satisfied order for the status of the row to be "true." In some embodiments, each row of user input elements may include a selection. The selection may indicate a portfolio of assets that should be pursued if the status of the row of user input elements is "true." In some embodiments, processor 104 may be configured to assign a corresponding selection if each element of the row of user input elements is positive. For example, for first row 1212, if each of indicator 1, indicator 2, and indicator 3 are positive, then processor may assign selection 1. In some embodiments, a user input element may be blank. In that case, that user input element may not be processed for the purposes of determining if the row of user input elements is true. In some embodiments, the selection may include a plurality of base portfolios, wherein each base portfolio is associated with a percent value. A "base portfolio," for the purposes of this disclosure is a template portfolio of assets.

With continued reference to FIG. 12, in some embodiments, processor may evaluate each row of user input elements sequentially. That is, if first row 1212 is true, then selection 1 is chosen; however, if first row 1212 is false, then the processor may proceed to the next row (second row 1216) and evaluate that row. If second row 1216 is true, then selection 2 may be made. This process may be carried out until a "true" row is found. If all rows of array of user input elements 1208 are exhausted and none of the rows are found to be "true," then processor 104 may select a fallback portfolio 1224. In some embodiments, a confirmation interface element 1228 may be presented as a part of interface 1200. When user selects confirmation interface element 1228, processor may be configured to generate a user configuration data structure 200 using the selections and, subsequently, carry out configuration of the signal processing module 212 and comparator module 228. In some embodiments, interface 1200 may include a cancelation interface element 1232. When user selects cancellation interface element 1232, processor 104 may clear user's selections and or close interface 1200.

Figure 13:
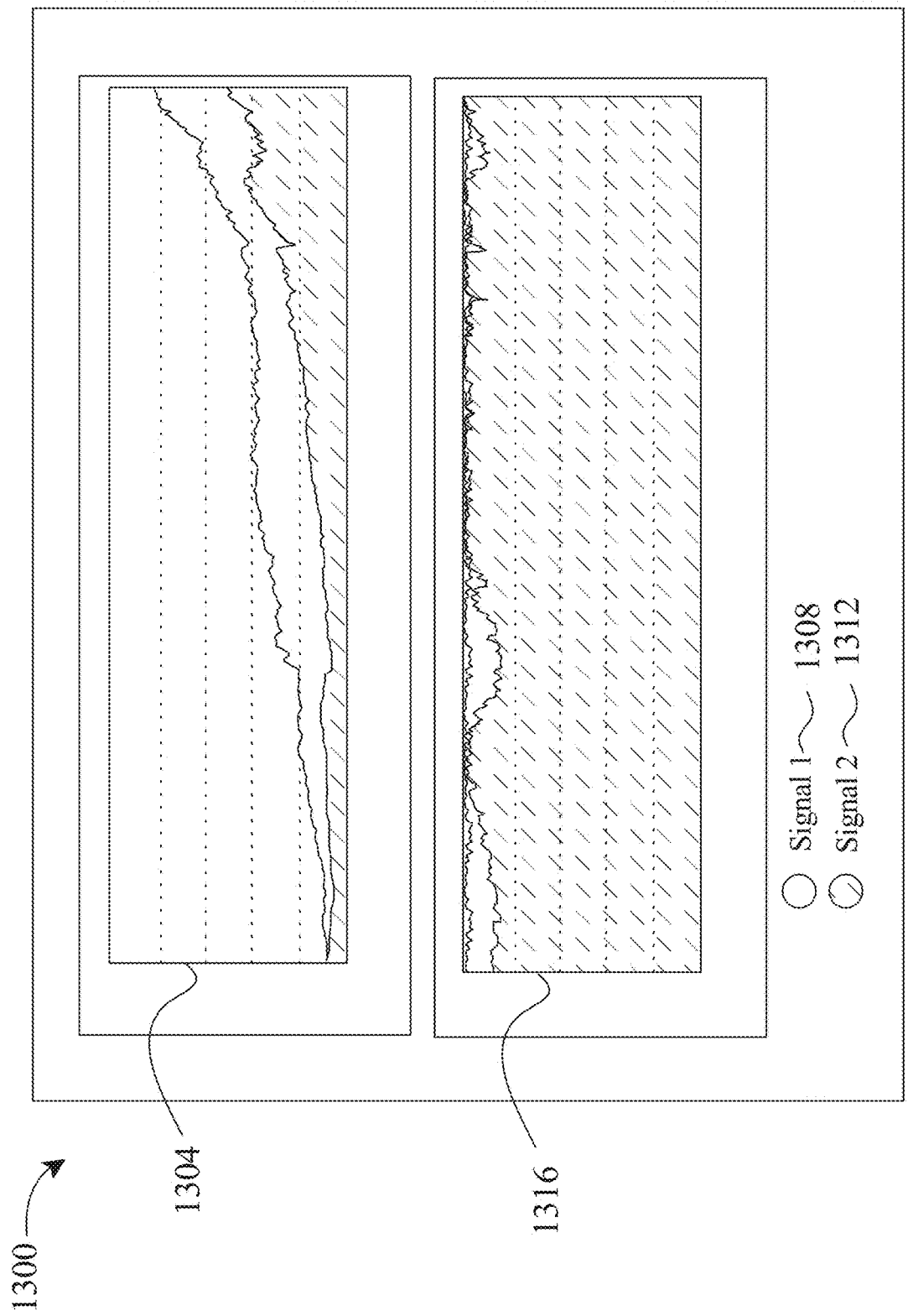
FIG. 13 is a diagram of an exemplary display.

Referring now to FIG. 13, an exemplary embodiment of a display 1300 is shown. In some embodiments, display 1300 may be generated by processor 104. In some embodiments, display 1300 may include a signal plot 1304. Signal plot 1304 may plot two signals against each other. For example, signal plot 1304 may plot first signal 1308 and second signal 1312 against one another. In some embodiments, first signal 1308 and/or second signal 1312 may include an input signal 120. In some embodiments, first signal 1308 and/or second signal 1312 may include a filtered signal 224. In some embodiments, first signal 1308 and/or second signal 1312 may include any indicators discussed in this disclosure. In some embodiments, display 1300 may include a drawdown plot 1316. Drawdown plot 1316 may show the drawdown of first signal 1308 and second signal 1312 plotted against one another. In some embodiments signal plot 1304 and/or drawdown plot 1316 may plot more than two signals against each other. In some embodiments signal plot 1304 and/or drawdown plot 1316 may plot 2-8 signals against each other.

Figure 14:
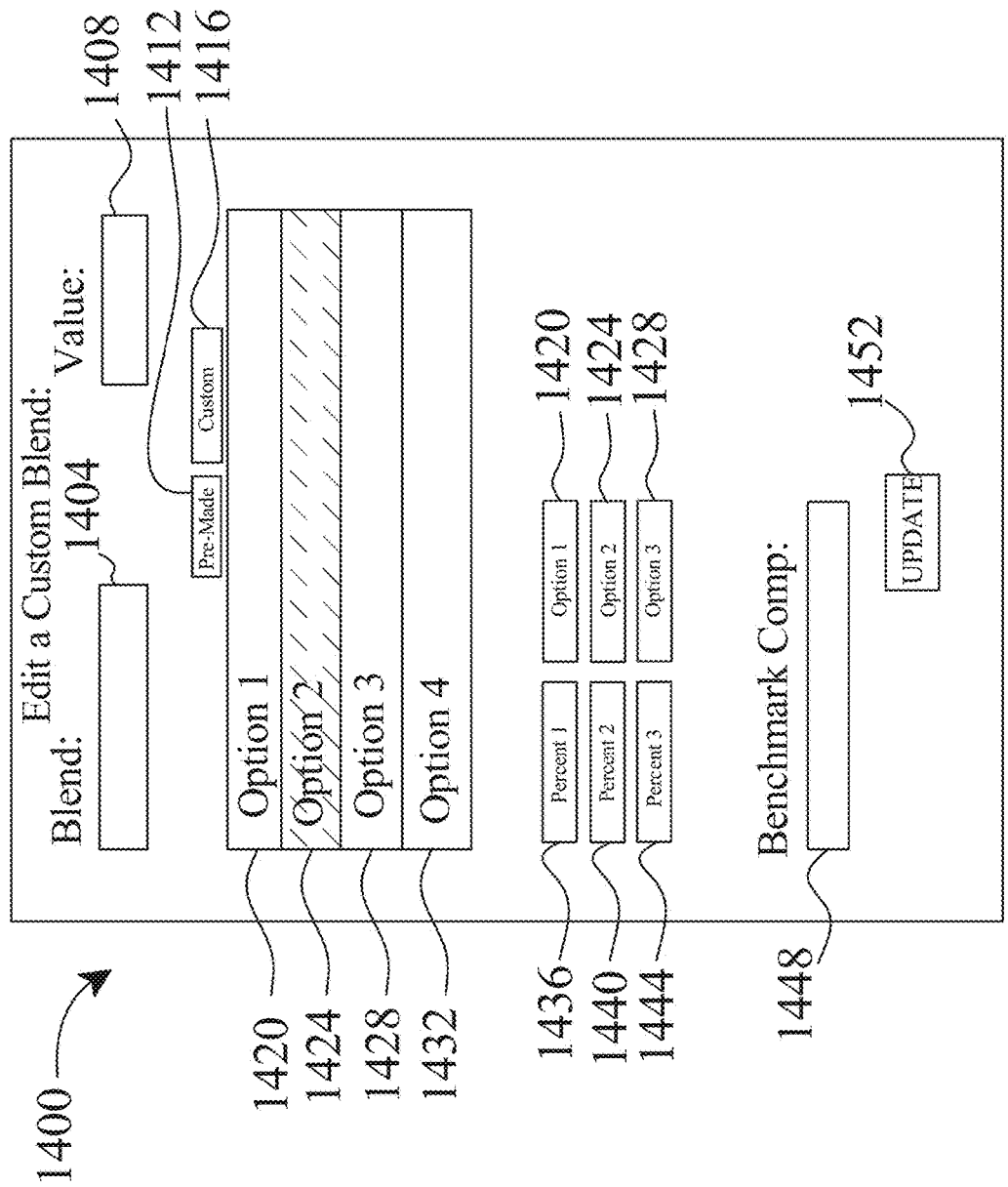
FIG. 14 is a diagram of an exemplary blend user interface.

Referring now to FIG. 14, a blend user interface 1400 is shown. Blend user interface 1400 may be used by a user to create a selection, such as the selection discussed with reference to FIG. 12. In some embodiments, interface 1400 may include a blend name input box 1404 in which user may input text to name a blend. In some embodiments, interface 1400 may include a value input box 1408, in which user may input numerical information to assign a value to blend. In some embodiments, interface 1400 may include a pre-made toggle 1412 and a custom toggle 1416, where the pre-made toggle 1412 and a custom toggle 1416 may allow users (depending on which one is selected) to display pre-made, or custom-made portfolios. In some embodiments, interface 1000 may display a selection or portfolios, e.g., first portfolio 1420, second portfolio 1424, third portfolio 1428, and forth portfolio 1432. Each portfolio may include a variety selected assets or asset classes. In some embodiments, interface 1400 may include a set of user interface elements, where user may indicate a percent of value (see value input box 1408) that should be indicated to a particular portfolio. In some embodiments, the set of user interface elements may include at least a first percent 1436 (associated with first portfolio 1420), a second percent 1440 (associated with second portfolio 1424), and a third percent 1444 (associated with a third portfolio 1428) User may be able to select first percent 1436, second percent 1440, and/or third percent 1444 using dropdown menus and/or numerical entry boxes, which may form a part of interface 1400. In some embodiments, interface 1400 may include a benchmark selector 1448. Benchmark selector 1448 may allow user to select a portfolio, asset, and/or asset class to compare the blend to. Benchmark selector 1448 may include a dropdown menu, search box, and the like. In some embodiments, interface

1400 may include an update user interface element 1452. Update user interface element 1452, when selected by user may save custom blend to memory and/or overwrite an old version of the custom blend.

Figure 15:
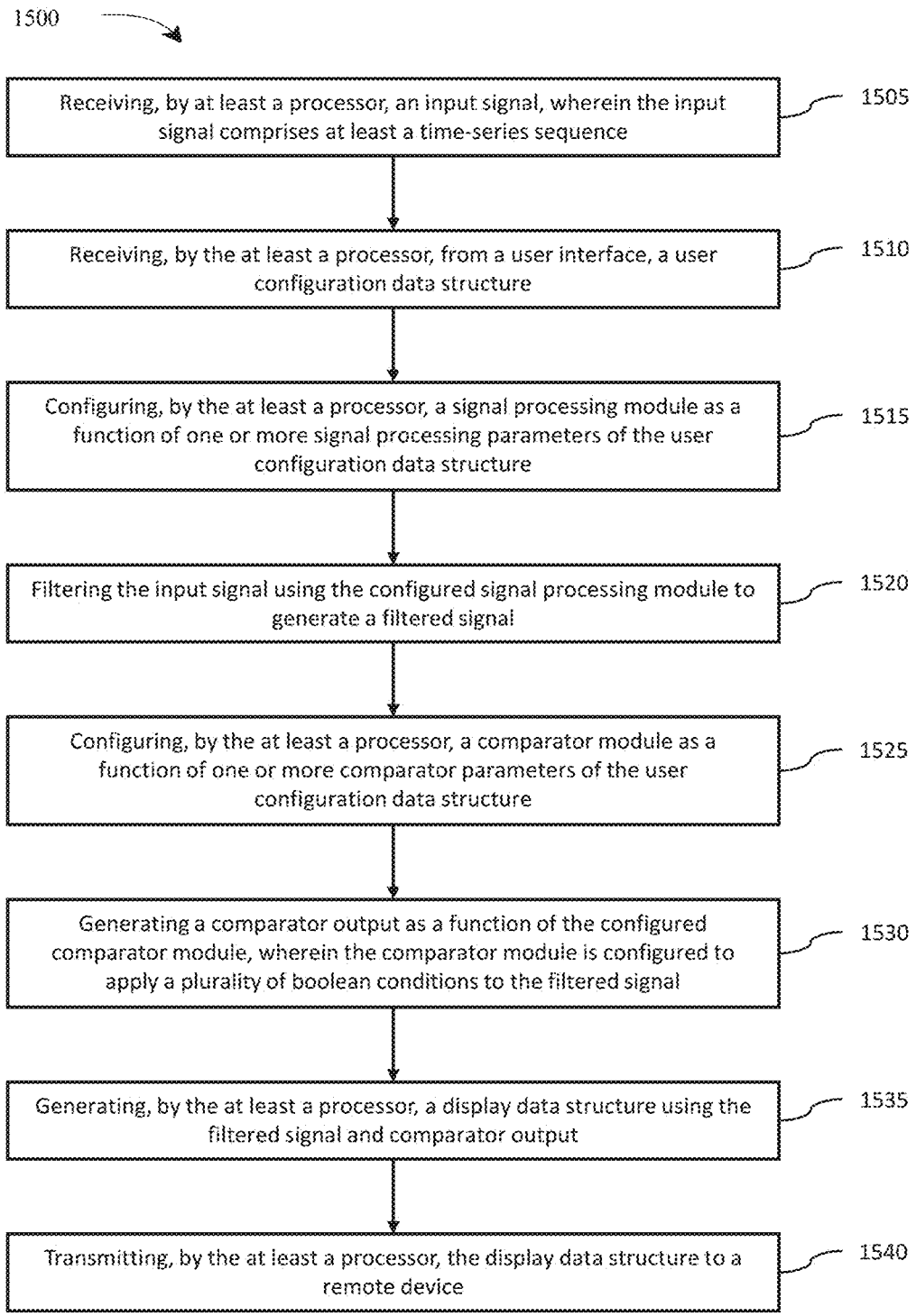
FIG. 15 is a diagram of an exemplary method of generating a generating a display data structure from an input signal.

Referring now to FIG. 15, a method 1500 for generating a display data structure from an input signal. In some embodiments, method 1500 may include a step 1505 of receiving, by at least a processor, an input signal, wherein the input signal comprises at least a time-series sequence. This may be implemented as disclosed with reference to FIGS. 1-14. Method 1500 may include a step 1510 of receiving, by the at least a processor, from a user interface, a user configuration data structure. This may be implemented as disclosed with reference to FIGS. 1-14. Method 1500 may include a step 1515 of configuring, by the at least a processor, a signal processing module as a function of one or more signal processing parameters of the user configuration data structure. This may be implemented as disclosed with reference to FIGS. 1-14. Method 1500 may include a step 1520 of filtering the input signal using the configured signal processing module to generate a filtered signal. This may be implemented as disclosed with reference to FIGS. 1-14. Method 1500 may include a step 1525 of configuring, by the at least a processor, a comparator module as a function of one or more comparator parameters of the user configuration data structure. This may be implemented as disclosed with reference to FIGS. 1-14. In some embodiments, method 1500 may include a step 1530 of generating a comparator output as a function of the configured comparator module, wherein the comparator module is configured to apply a plurality of boolean conditions to the filtered signal. This may be implemented as disclosed with reference to FIGS. 1-14. In some embodiment, method 1500 may include a step 1535 of generating, by the at least a processor, a display data structure using the filtered signal and comparator output. This may be implemented as disclosed with reference to FIGS. 1-14. In some embodiments, method 1500 may include a step 1540 of transmitting, by the at least a processor, the display data structure to a remote device. This may be implemented as disclosed with reference to FIGS. 1-14. In some embodiments, method 1500 may include a step of determining, by the at least a processor, the corresponding selection as a function of the user configuration data structure. This may be implemented as disclosed with reference to FIGS. 1-14.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 16:
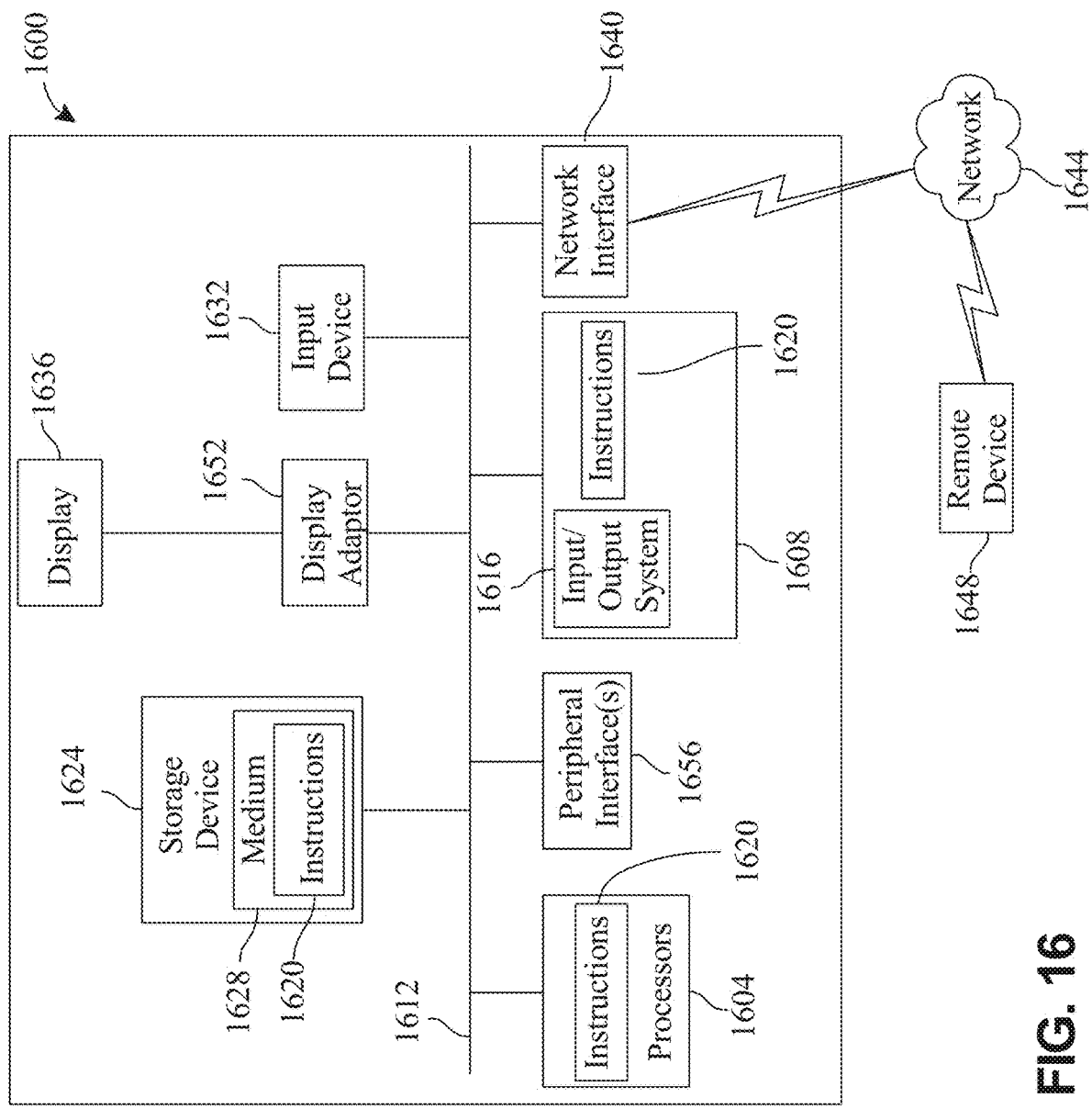
FIG. 16 is a block diagram of a computing system that can be used to implement any one or more of the methodologies disclosed herein and any one or more portions thereof.

FIG. 16 shows a diagrammatic representation of one embodiment of a computing device in the exemplary form of a computer system 1600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1600 includes a processor 1604 and a memory 1608 that communicate with each other, and with other components, via a bus 1612. Bus 1612 may include any of several types of bus structures including, but not limited to, a memory bus, a memory controller, a peripheral bus, a local bus, and any combinations thereof, using any of a variety of bus architectures.

Processor 1604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1604 may be organized according to Von Neumann and/or Harvard architecture as a non-limiting example. Processor 1604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1608 may include various components (e.g., machine-readable media) including, but not limited to, a random-access memory component, a read only component, and any combinations thereof. In one example, a basic input/output system 1616 (BIOS), including basic routines that help to transfer information between elements within computer system 1600, such as during start-up, may be stored in memory 1608. Memory 1608 may also include (e.g., stored on one or more machine-readable media) instructions (e.g., software) 1620 embodying any one or more of the aspects and/or methodologies of the present disclosure. In another example, memory 1608 may further include any number of program modules including, but not limited to, an operating system, one or more application programs, other program modules, program data, and any combinations thereof.

Computer system 1600 may also include a storage device 1624. Examples of a storage device (e.g., storage device 1624) include, but are not limited to, a hard disk drive, a magnetic disk drive, an optical disc drive in combination with an optical medium, a solid-state memory device, and any combinations thereof. Storage device 1624 may be connected to bus 1612 by an appropriate interface (not shown). Example interfaces include, but are not limited to, SCSI, advanced technology attachment ($A^TA$), serial $A^TA$, universal serial bus (USB), IEEE 1394 (FIREWIRE), and any combinations thereof. In one example, storage device 1624 (or one or more components thereof) may be removably interfaced with computer system 1600 (e.g., via an external port connector (not shown)). Particularly, storage device 1624 and an associated machine-readable medium 1628 may provide nonvolatile and/or volatile storage of machine-readable instructions, data structures, program modules, and/or other data for computer system 1600. In one example, software 1620 may reside, completely or partially, within machine-readable medium 1628. In another example, software 1620 may reside, completely or partially, within processor 1604.

Computer system 1600 may also include an input device 1632. In one example, a user of computer system 1600 may enter commands and/or other information into computer system 1600 via input device 1632. Examples of an input device 1632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1632 may be interfaced to bus 1612 via any of a variety of interfaces (not shown) including, but not limited to, a serial interface, a parallel interface, a game port, a USB interface, a FIREWIRE interface, a direct interface to bus 1612, and any combinations thereof. Input device 1632 may include a touch screen interface that may be a part of or separate from display 1636, discussed further below. Input device 1632 may be utilized as a user selection device for selecting one or more graphical representations in a graphical interface as described above.

A user may also input commands and/or other information to computer system 1600 via storage device 1624 (e.g., a removable disk drive, a flash drive, etc.) and/or network interface device 1640. A network interface device, such as network interface device 1640, may be utilized for connecting computer system 1600 to one or more of a variety of networks, such as network 1644, and one or more remote devices 1648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1644, may employ a wired and/or a wireless mode of communication. In general, any network topology may be used. Information (e.g., data, software 1620, etc.) may be communicated to and/or from computer system 1600 via network interface device 1640.

Computer system 1600 may further include a video display adapter 1652 for communicating a displayable image to a display device, such as display 1636. Examples of a display device include, but are not limited to, a liquid crystal display (LCD), a cathode ray tube (CRT), a plasma display, a light emitting diode (LED) display, and any combinations thereof. Display adapter 1652 and display 1636 may be utilized in combination with processor 1604 to provide graphical representations of aspects of the present disclosure. In addition to a display device, computer system 1600 may include one or more other peripheral output devices including, but not limited to, an audio speaker, a printer, and any combinations thereof. Such peripheral output devices may be connected to bus 1612 via a peripheral interface 1656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a display data structure from an input signal, wherein the apparatus comprises:
   at least a processor; and
   a memory communicatively connected to the at least a processor, wherein the memory contains instructions configuring the at least a processor to:
   receive an input signal, wherein the input signal comprises at least a time-series sequence;

receive, from a user interface, a user configuration data structure;

configure a signal processing module as a function of one or more signal processing parameters of the user configuration data structure, wherein configuring the signal processing module comprises selecting one or more sub-modules of the signal processing module as a function of the one or more signal processing parameters, wherein selecting one or more sub-modules of the signal processing module as a function of the one or more signal processing parameters comprises selecting a momentum processing module and an autoregressive signal processing module;

filter the input signal using the configured signal processing module to generate a filtered signal, wherein filtering the input signal using the configured signal processing module to generate the filtered signal comprises sequentially applying the momentum processing module and the autoregressive signal processing module to the input signal;

configure a comparator module as a function of one or more comparator parameters of the user configuration data structure;

generate a comparator output as a function of the configured comparator module, wherein the comparator module is configured to apply a plurality of boolean conditions to the filtered signal;

generate a display data structure using the filtered signal and comparator output; and transmit the display data structure to a remote device.

2. The apparatus of claim 1, wherein receiving the user configuration data structure, comprises:

generating a user configuration display data structure, wherein the user configuration display data structure comprises an array of user input elements, wherein the user input elements define the plurality of boolean conditions; and determining the one or more comparator parameters as a function of the user input elements.

3. The apparatus of claim 2, wherein the array of user input elements comprises a plurality of dropdown menus, wherein each of the plurality of dropdown menus are configured to allow a user to select an indicator of a plurality of indicators.

4. The apparatus of claim 2, wherein:

the array of user input elements comprises at least one row of user input elements; and generating the comparator output comprises:
  determining a status of each element of the at least one row of user input elements; and
  assigning a corresponding selection if each element of the at least one row of user input elements is positive.

5. The apparatus of claim 4, wherein the corresponding selection comprises a plurality of base portfolios, wherein each base portfolio is associated with a percent value.

6. The apparatus of claim 5, wherein the memory contains instructions configuring the at least a processor to determine the corresponding selection as a function of the user configuration data structure.

7. The apparatus of claim 1, wherein:

selecting one or more sub-modules of the signal processing module as a function of the one or more signal processing parameters comprises selecting a first smoothing processing module and a second smoothing processing module;

filtering the input signal using the configured signal processing module to generate the filtered signal comprises:
  applying the first smoothing processing module to the input signal, wherein the first smoothing processing module is configured to use a first temporal coefficient; and
  applying the second smoothing processing module to the input signal, wherein the second smoothing processing module is configured to use a second temporal coefficient.

8. The apparatus of claim 1, wherein selecting one or more sub-modules of the signal processing module as a function of the one or more signal processing parameters comprises selecting a linear predictor module; and filtering the input signal using the configured signal processing module to generate the filtered signal comprises applying the linear predictor module to the input signal.

9. A method for generating a display data structure from an input signal, wherein the method comprises:

receiving, by at least a processor, an input signal, wherein the input signal comprises at least a time-series sequence;

receiving, by the at least a processor, from a user interface, a user configuration data structure;

configuring, by the at least a processor, a signal processing module as a function of one or more signal processing parameters of the user configuration data structure, wherein configuring the signal processing module comprises selecting one or more sub-modules of the signal processing module as a function of the one or more signal processing parameters, wherein selecting one or more sub-modules of the signal processing module as a function of the one or more signal processing parameters comprises selecting a momentum processing module and an autoregressive signal processing module;

filtering the input signal using the configured signal processing module to generate a filtered signal, wherein filtering the input signal using the configured signal processing module to generate the filtered signal comprises sequentially applying the momentum processing module and the autoregressive signal processing module to the input signal;

configuring, by the at least a processor, a comparator module as a function of one or more comparator parameters of the user configuration data structure;

generating a comparator output as a function of the configured comparator module, wherein the comparator module is configured to apply a plurality of boolean conditions to the filtered signal;

generating, by the at least a processor, a display data structure using the filtered signal and comparator output; and transmitting, by the at least a processor, the display data structure to a remote device.

10. The method of claim 9, wherein receiving the user configuration data structure, comprises:

generating a user configuration display data structure, wherein the user configuration display data structure comprises an array of user input elements, wherein the user input elements define the plurality of boolean conditions; and determining the one or more comparator parameters as a function of the user input elements.

11. The method of claim 10, wherein the array of user input elements comprises a plurality of dropdown menus, wherein each of the plurality of dropdown menus are configured to allow a user to select an indicator of a plurality of indicators.

12. The method of claim 10, wherein:
the array of user input elements comprises at least one row of user input elements; and
generating the comparator output comprises:
  determining a status of each element of the at least one row of user input elements; and
  assigning a corresponding selection if each element of the at least one row of user input elements is positive.

13. The method of claim 12, wherein the corresponding selection comprises a plurality of base portfolios, wherein each base portfolio is associated with a percent value.

14. The method of claim 13, further comprising determining, by the at least a processor, the corresponding selection as a function of the user configuration data structure.

15. The method of claim 9, wherein:
selecting one or more sub-modules of the signal processing module as a function of the one or more signal processing parameters comprises selecting a first smoothing processing module and a second smoothing processing module;
filtering the input signal using the configured signal processing module to generate the filtered signal comprises:
  applying the first smoothing processing module to the input signal, wherein the first smoothing processing module is configured to use a first temporal coefficient; and
  applying the second smoothing processing module to the input signal, wherein the second smoothing processing module is configured to use a second temporal coefficient.

16. The method of claim 9, wherein
selecting one or more sub-modules of the signal processing module as a function of the one or more signal processing parameters comprises selecting a linear predictor module; and
filtering the input signal using the configured signal processing module to generate the filtered signal comprises applying the linear predictor module to the input signal.

* * * * *